(12) United States Patent
Sheik et al.

(10) Patent No.: US 11,871,344 B2
(45) Date of Patent: Jan. 9, 2024

(54) PREFERENCE SIGNALING FOR A MULTI-SUBSCRIPTION WIRELESS DEVICE

(71) Applicant: QUALCOMM Incorporated, San Diego, CA (US)

(72) Inventors: Ansah Ahmed Sheik, Hyderabad (IN); Sayak Saha, Hyderabad (IN); Rajeev Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 17/398,888

(22) Filed: Aug. 10, 2021

(65) Prior Publication Data

US 2023/0050907 A1    Feb. 16, 2023

(51) Int. Cl.
*H04W 52/02* (2009.01)
*H04W 76/30* (2018.01)
*H04W 76/10* (2018.01)
*H04W 8/18* (2009.01)

(52) U.S. Cl.
CPC ......... *H04W 52/0212* (2013.01); *H04W 8/18* (2013.01); *H04W 76/10* (2018.02); *H04W 76/30* (2018.02)

(58) Field of Classification Search
None
See application file for complete search history.

(56) References Cited

U.S. PATENT DOCUMENTS

2021/0105866 A1*   4/2021   Kavuri .................. H04W 76/28

* cited by examiner

*Primary Examiner* — Kouroush Mohebbi
(74) *Attorney, Agent, or Firm* — Holland & Hart LLP

(57) ABSTRACT

Methods, systems, and devices for wireless communications are described. A user equipment (UE) associated with a first subscription and a second subscription may establish a connection with a base station, the first subscription in a connected state. The UE may use the first subscription to perform a communication activity with the base station while the first subscription is in the connected state. Upon completion of the communication activity, the UE may transmit UE assistance information (UAI) to the base station indicating a preference of the UE to switch the first subscription to an inactive state in response to a release message from the base station.

30 Claims, 17 Drawing Sheets

PREFERENCE SIGNALING FOR A MULTI-SUBSCRIPTION WIRELESS DEVICE

FIELD OF TECHNOLOGY

The following relates to wireless communications, including preference signaling for a multi-subscription wireless device.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a multi-subscriber identity module (MSIM) device may communicate with a base station using different subscriptions. However, techniques to improve power savings and throughput at the MSIM device could be improved.

SUMMARY

The described techniques relate to improved methods, systems, devices, and apparatuses that support preference signaling for a multi-subscription wireless device. Generally, the described techniques provide for a multi-subscription wireless device (e.g., a user equipment (UE)) to use preference signaling to achieve improved power efficiency, improved throughput, lower latency, or other performance benefits. In some cases, the UE may be associated with a first subscription (e.g., a non-default data subscription (nDDS)) and a second subscription (e.g., a default data subscription (DDS)), and the UE may establish a connection with a base station such that the first subscription is in a connected state. The UE may use the first subscription to perform a data activity with the base station while the first subscription is in the connected state. Upon completion of the data activity, the UE may indicate a preference of the UE to the base station to switch the first subscription from the connected state to an inactive state, for example as opposed to switching the first subscription to an idle state. In some cases, the UE may indicate the preference of the UE in a UE assistance information (UAI) message in response to a release message from the base station.

In some cases, after the first subscription is in the inactive state for some duration, the first subscription may switch back to the connected state to perform one or more update procedures (e.g., a radio access network area update (RNAU) procedure) with the base station, which may counteract the benefits of the first subscription being in the inactive state (e.g., as opposed to the idle state). For example, the base station may configure a timer to have some duration, and upon an expiration of the timer, the first subscription may switch from the inactive state to the connected state to perform the update procedure. In some cases, to reduce the extent to which the benefits of the first subscription being in the inactive state are counteracted, the UE may use one or more timers with durations different than the timer duration configured by the base station, or the UE may indicate a preference for an extended duration of the timer configured by the base station.

A method for wireless communication at a UE is described. The method may include establishing a connection with a base station, where the UE is associated with a DDS and an nDDS, and where the nDDS is in a connected state after the connection is established, using the nDDS to perform a communication activity with the base station while the nDDS is in the connected state, and transmitting, to the base station and based on a completion of the communication activity, a UAI message including an indication of a preference of the UE to switch, in response to a release message from the base station, the nDDS from the connected state to an inactive state.

An apparatus for wireless communication at a UE is described. The apparatus may include a processor, memory coupled with the processor, and instructions stored in the memory. The instructions may be executable by the processor to cause the apparatus to establish a connection with a base station, where the UE is associated with a DDS and an nDDS, and where the nDDS is in a connected state after the connection is established, use the nDDS to perform a communication activity with the base station while the nDDS is in the connected state, and transmit, to the base station and based on a completion of the communication activity, a UAI message including an indication of a preference of the UE to switch, in response to a release message from the base station, the nDDS from the connected state to an inactive state.

Another apparatus for wireless communication at a UE is described. The apparatus may include means for establishing a connection with a base station, where the UE is associated with a DDS and an nDDS, and where the nDDS is in a connected state after the connection is established, means for using the nDDS to perform a communication activity with the base station while the nDDS is in the connected state, and means for transmitting, to the base station and based on a completion of the communication activity, a UAI message including an indication of a preference of the UE to switch, in response to a release message from the base station, the nDDS from the connected state to an inactive state.

A non-transitory computer-readable medium storing code for wireless communication at a UE is described. The code may include instructions executable by a processor to establish a connection with a base station, where the UE is associated with a DDS and an nDDS, and where the nDDS is in a connected state after the connection is established, used the nDDS to perform a communication activity with the base station while the nDDS is in the connected state, and transmit, to the base station and based on a completion of the communication activity, a UAI message including an indication of a preference of the UE to switch, in response to a release message from the base station, the nDDS from the connected state to an inactive state.

Some examples of the method, apparatuses, and non-transitory computer-readable medium described herein may further include operations, features, means, or instructions for receiving the release message from the base station after transmitting the UAI message, where the release message indicates for the UE to switch the nDDS to the inactive state and switching the nDDS from the connected state to the inactive state based on receiving the release message.

In some examples of the method, apparatuses, and non-transitory computer-readable medium described herein, the release message includes a radio resource control (RRC) release message.

Some examples of the method, apparatuses, and non-transitory computer-readable medium described herein may further include operations, features, means, or instructions for transmitting, to the base station, a request to resume the connection based on an additional communication activity for the nDDS, receiving, from the base station after transmitting the request to resume the connection, a resume message indicating for the UE to resume the connection, switching the nDDS from the inactive state to the connected state based on receiving the resume message, and using the nDDS, after receiving the resume message, to perform the additional communication activity with the base station while the nDDS may be in the connected state.

Some examples of the method, apparatuses, and non-transitory computer-readable medium described herein may further include operations, features, means, or instructions for receiving, from the base station, an indication of a first duration of a first timer, where an expiration of the first timer may be associated with the UE performing an RNAU procedure after switching the nDDS from the connected state to the inactive state, configuring a second timer with a second duration shorter than the first duration, initiating the second timer based on switching the nDDS from the connected state to the inactive state, evaluating a status of the DDS based on an expiration of the second timer, and performing the RNAU procedure at a time that may be based on the status of the DDS.

Some examples of the method, apparatuses, and non-transitory computer-readable medium described herein may further include operations, features, means, or instructions for initiating a third timer with a third duration based on the status of the DDS including the DDS being in the connected state and engaged in a second communication activity and monitoring the status of the DDS after reinitiating the second timer and before an expiration of the third timer.

Some examples of the method, apparatuses, and non-transitory computer-readable medium described herein may further include operations, features, means, or instructions for detecting a switch of the DDS from the connected state to an idle state based on monitoring the status of the DDS, where performing the RNAU procedure may be based on the switch of the DDS from the connected state to the idle state, and where the time may be independent of a value of the third timer.

Some examples of the method, apparatuses, and non-transitory computer-readable medium described herein may further include operations, features, means, or instructions for continuing to monitor the status of the DDS after the expiration of the third timer based on the DDS being in the connected state and engaged in the second communication activity throughout the third duration and detecting a cessation of the second communication activity based on continuing to monitor the status of the DDS, where performing the RNAU procedure may be based on the cessation of the second communication activity, and where the time may be after the expiration of the third timer.

Some examples of the method, apparatuses, and non-transitory computer-readable medium described herein may further include operations, features, means, or instructions for detecting a cessation of the second communication activity based on monitoring the status of the DDS, where performing the RNAU procedure may be based on the cessation of the second communication activity, and where the time may be before the expiration of the third timer.

In some examples of the method, apparatuses, and non-transitory computer-readable medium described herein, the third duration may be equal to a difference between the first duration and the second duration.

Some examples of the method, apparatuses, and non-transitory computer-readable medium described herein may further include operations, features, means, or instructions for initiating a third timer with a third duration based on the status of the DDS including the DDS being in the connected state with no ongoing activity, where performing the RNAU procedure may be based on the DDS being in the connected state with no ongoing activity, and where the time may be no earlier than the expiration of the third timer.

Some examples of the method, apparatuses, and non-transitory computer-readable medium described herein may further include operations, features, means, or instructions for based on the status of the DDS including the DDS being in an idle state, the time corresponds to an earliest opportunity of the UE after evaluating the status of the DDS.

In some examples of the method, apparatuses, and non-transitory computer-readable medium described herein, a duration between initiating the second timer and the time may be less than the first duration.

Some examples of the method, apparatuses, and non-transitory computer-readable medium described herein may further include operations, features, means, or instructions for transmitting, to the base station, an indication of a second preference of the UE for an extended duration of a timer associated with the UE performing an RNAU procedure after switching the nDDS from the connected state to the inactive state, the extended duration longer than a default duration of the timer.

In some examples of the method, apparatuses, and non-transitory computer-readable medium described herein, the indication of the second preference may be transmitted as part of the UAI message.

In some examples of the method, apparatuses, and non-transitory computer-readable medium described herein, the preference of the UE to switch the n nDDS from the connected state to the inactive state in response to the release message from the base station includes a preference to not switch the nDDS to an idle state in response to the release message.

A method for wireless communication at a base station is described. The method may include establishing a connection with a UE, where the UE is associated with a DDS and an nDDS, and where the connection is for the nDDS, engaging in a communication activity with the UE using the connection and the nDDS, and receiving, from the UE and based on a completion of the communication activity, a UAI message including an indication of a preference of the UE to switch the nDDS from a connected state to an inactive state in response to a release message from the base station.

An apparatus for wireless communication at a base station is described. The apparatus may include a processor, memory coupled with the processor, and instructions stored in the memory. The instructions may be executable by the processor to cause the apparatus to establish a connection with a UE, where the UE is associated with a DDS and an nDDS, and where the connection is for the nDDS, engage in a communication activity with the UE using the connection and the nDDS, and receive, from the UE and based on a completion of the communication activity, a UAI message including an indication of a preference of the UE to switch the nDDS from a connected state to an inactive state in response to a release message from the base station.

Another apparatus for wireless communication at a base station is described. The apparatus may include means for establishing a connection with a UE, where the UE is associated with a DDS and an nDDS, and where the connection is for the nDDS, means for engaging in a communication activity with the UE using the connection and the nDDS, and means for receiving, from the UE and based on a completion of the communication activity, a UAI message including an indication of a preference of the UE to switch the nDDS from a connected state to an inactive state in response to a release message from the base station.

A non-transitory computer-readable medium storing code for wireless communication at a base station is described. The code may include instructions executable by a processor to establish a connection with a UE, where the UE is associated with a DDS and an nDDS, and where the connection is for the nDDS, engage in a communication activity with the UE using the connection and the nDDS, and receive, from the UE and based on a completion of the communication activity, a UAI message including an indication of a preference of the UE to switch the nDDS from a connected state to an inactive state in response to a release message from the base station.

Some examples of the method, apparatuses, and non-transitory computer-readable medium described herein may further include operations, features, means, or instructions for transmitting the release message to the UE after receiving the UAI message, where the release message indicates for the UE to switch the nDDS to the inactive state.

In some examples of the method, apparatuses, and non-transitory computer-readable medium described herein, the release message includes an RRC release message.

Some examples of the method, apparatuses, and non-transitory computer-readable medium described herein may further include operations, features, means, or instructions for receiving, from the UE, a request to resume the connection, transmitting, to the UE after receiving the request to resume the connection, a resume message indicating for the UE to resume the connection, and engaging, after transmitting the resume message, in an additional communication activity with the UE using the connection and the nDDS.

Some examples of the method, apparatuses, and non-transitory computer-readable medium described herein may further include operations, features, means, or instructions for receiving, from the UE, an indication of a second preference of the UE for an extended duration of a timer associated with the UE performing an RNAU procedure after switching the nDDS from the connected state to the inactive state, the extended duration longer than a default duration of the timer.

In some examples of the method, apparatuses, and non-transitory computer-readable medium described herein, the indication of the second preference may be received as part of the UAI message.

In some examples of the method, apparatuses, and non-transitory computer-readable medium described herein, the preference of the UE to switch the nDDS to the inactive state in response to the release message from the base station includes a preference to not switch the nDDS to an idle state in response to the release message.

DETAILED DESCRIPTION

Figure 1:
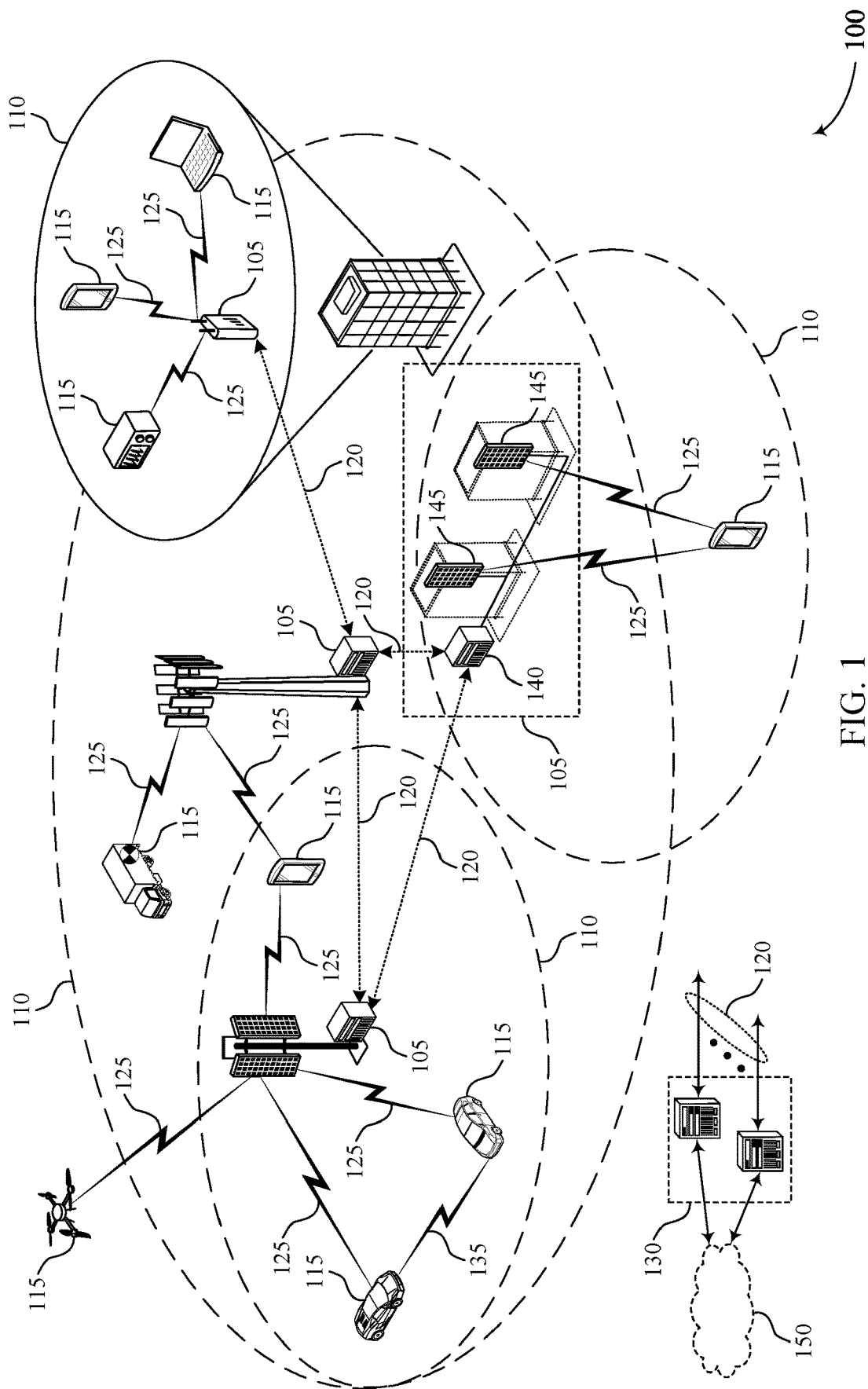
FIG. 1 illustrates an example of a wireless communications system that supports preference signaling for a multi-subscription wireless device in accordance with aspects of the present disclosure.

In some wireless communications systems, a user equipment (UE) may be associated with a first subscription and a second subscription. For example, the UE may be a multi-subscriber identity module (MSIM) UE, where the first subscription may correspond to a non-default data subscription (nDDS) and the second subscription may correspond to a default data subscription (DDS). The UE may communicate with a base station using the first subscription, and may experience a period of inactivity. In some cases, based on the inactivity, the base station may switch the first subscription to an idle state. But if the UE waits until it receives a release message from the base station to switch the first subscription from a connected state to an idle state, this may increase power consumption at the UE by an undesirable amount, may prevent the second subscription from being used for an undesirable length of time, or both, depending on how long the UE waits. Alternatively, rather than wait until it receives a release message from the base station, the UE may in some cases perform a local release after some period of inactivity. In such cases, however, the UE may release prematurely before a release from the base station and as such, the UE may in some cases soon thereafter be forced to reconnect the first subscription (e.g., due to data activity for the UE, of which the UE may not have been aware, occurring soon after the local release). Additionally or alternatively, the UE may establish a new connection if there are more data activities soon after the local release, which may increase power consumption, signaling loads, and latency. In some examples, if the UE receives a release message from the base station soon after the data activity ends, the UE may still establish a new connection if there is more data activity soon thereafter, which may likewise increase power usage, signaling loads, and latency.

Techniques described herein enable a multi-subscription wireless device (e.g., a UE) to use preference signaling to achieve improved power efficiency, improved throughput, lower latency, or other performance benefits. In some cases, the UE may be associated with a first subscription (e.g., an nDDS) and a second subscription (e.g., a DDS), and the UE may establish a connection with a base station such that the first subscription is in a connected state (e.g., RRC_CONNECTED). The UE may use the first subscription to perform a data activity (e.g., a communication activity) with the base station while the first subscription is in the connected state. Upon completion of the data activity, the UE may indicate a preference of the UE to the base station to switch the first subscription from the connected state to an inactive state (e.g., RRC_INACTIVE), for example as opposed to switching the first subscription to an idle state (e.g., RRC_IDLE). In some cases, the UE may indicate the preference of the UE in a UE assistance information (UAI) message in response to a release message from the base station.

In some cases, after the first subscription is in the inactive state for some duration, the first subscription may switch back to the connected state to perform one or more procedures, such as one or more update procedures (e.g., a random access network (RAN) area update (RNAU) procedure) with the network, which may counteract the benefits of the first subscription being in the inactive state (e.g., as opposed to the idle state). For example, the base station may configure a timer to have some duration, and upon an expiration of the timer, the first subscription may switch from the inactive state to the connected state to perform the update procedure. In some cases, however, a UE as described herein may use one or more timers with durations different than the timer duration configured by the base station, or the UE may indicate a preference (e.g., in the UAI) for an extended duration of the timer configured by the base station, which may help preserve the benefits of the first subscription being in the inactive state (that is, reduce the extent to which such benefits are counteracted by such update procedures and associated reconnections).

Particular aspects of the subject matter described herein may be implemented to realize one or more advantages. The described techniques may support improvements in communications at MSIM wireless devices by reducing latency of user activities and decreasing power consumption as the devices may operate in a connected state for a shorter duration. Further, in some examples, switching an MSIM wireless device from a connected state to an inactive state instead of an idle state may reduce the power consumption and signaling loads involved in the switching. As such, supported techniques may include improved network operations, and, in some examples, may promote network efficiencies, among other benefits.

Aspects of the disclosure are initially described in the context of wireless communications systems. Aspects of the disclosure are then described with reference to process flows and block diagrams. Aspects of the disclosure are further illustrated by and described with reference to apparatus diagrams, system diagrams, and flowcharts that relate to preference signaling for a multi-subscription wireless device.

FIG. 1 illustrates an example of a wireless communications system 100 that supports preference signaling for a multi-subscription wireless device in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or other types of high-reliability or low latency communications. Support for such functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a wireless device (e.g., a UE 115) may be a multi-subscription (e.g., multi-SIM) device, and the wireless device may be able to connect with a network entity (e.g., a base station 105) using any one subscription at a given time. A multi-subscription wireless device may use preference signaling as described herein to achieve improved power efficiency, improved throughput, lower latency, or other performance benefits. In some cases, the UE 115 may be associated with a first subscription (e.g., an nDDS) and a second subscription (e.g., a DDS), and the UE 115 may establish a connection with a base station 105 such that the first subscription is in a connected state. The UE 115 may use the first subscription to perform a data activity (e.g., a communication activity) with the base station 105 while the first subscription is in the connected state. Upon completion of the data activity, the UE 115 may indicate a preference of the UE 115 to the base station 105 to switch the first subscription from the connected state to an inactive state, for example as opposed to switching the first subscription to an idle state. In some cases, the UE 115 may indicate the preference in a UAI message in response to a release message from the base station 105.

In some cases, after the first subscription is in the inactive state for some duration, the first subscription may switch back to the connected state to perform a procedure (e.g., an update procedure) with the base station 105, which may counteract the benefits of the first subscription being in the inactive state (e.g., as opposed to the idle state). For example, the base station 105 may configure a timer to have some duration, and upon an expiration of the timer, the first subscription may switch from the inactive state to the connected state to perform the procedure. In some cases, the UE 115 may use one or more timers with durations different than the timer duration configured by the base station 105, or the UE 115 may indicate (e.g., in the UAI) a preference for an extended duration of the timer configured by the base station 105, which may reduce the extent to which benefits of the first subscription being in the inactive state are counteracted.

Figure 2:
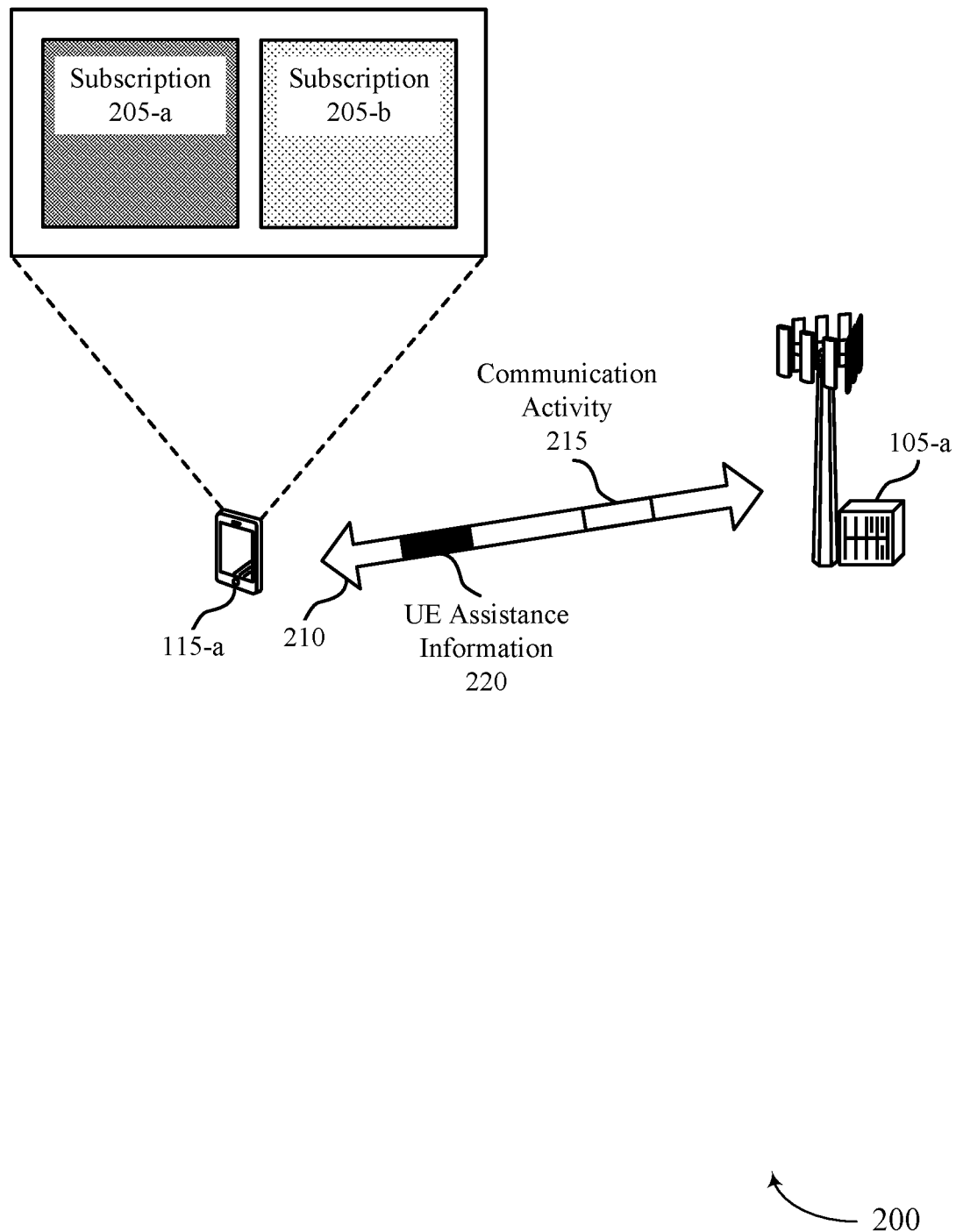
FIG. 2 illustrates an example of a wireless communications system that supports preference signaling for a multi-subscription wireless device in accordance with aspects of the present disclosure.

FIG. 2 illustrates an example of a wireless communications system 200 that supports preference signaling for a multi-subscription wireless device in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a and a base station 105-a, which may be examples of corresponding devices described herein with reference to FIG. 1. The wireless communications system 200 may include features for improved communications between the UE 115-a and the base station 105-a, among other benefits.

The UE 115-a may be associated with a subscription 205-a and a subscription 205-b. In some cases, the UE 115-a may be an MSIM UE, where the subscription 205-a may correspond to an nDDS and the subscription 205-b may correspond to a DDS. In some cases, for example, the subscription 205-b may include a data plan, and the subscription 205-a may be used for voice communications. As such, the UE 115-a may indicate that the subscription 205-b is the DDS, and the UE 115-a may use the subscription 205-b as the default subscription for activities that may use data. In some cases, the UE 115-a may indicate whether to use the subscription 205-a or the subscription 205-b for data transmissions as a preference of the UE 115-a, and as such the data transmissions may usually occur on the preferred subscription 205.

The UE 115-a (e.g., an MSIM UE) may have a limited amount of radio resources such that one subscription 205 may enter a connected state and use the resources at a time. For example, the subscription 205-a may be in a connected state and the subscription 205-b may be in an idle state. If some data activity occurs (e.g., a voice call, a multimedia message), the subscription 205-b may take over the resources from the subscription 205-a (e.g., the subscription 205-b may transition to the connected state) and the subscription 205-a may release the resources for the subscription 205-b (e.g., the subscription 205-a may transition to the idle state). Upon completion of the data activity and after a period of inactivity, the subscription 205-b may release the resources back to the subscription 205-a for other data activities, where the subscription 205-b may transition back to the idle state and the subscription 205-a may transition back to the connected state.

In some cases, the UE 115-a may communicate with the base station 105-a via a communications link 210. The UE 115-a may communicate with the base station 105-a using the subscription 205-a in a connected state, and the UE 115-a may experience a period of inactivity. After the period of inactivity, the base station 105-a (e.g., a network) may send a release (e.g., an RRC release) to the UE 115-a that may switch the subscription 205-a to an idle state. In some cases, the subscription 205-b may be preempted for a connected activity associated with the subscription 205-a.

In some examples, the UE 115-a may perform a local release after the period of inactivity (e.g., after a few seconds of inactivity). If the UE 115-a releases prematurely, without waiting for the release from the base station 105-a, the UE 115-a may switch the subscription 205-a back to the connected state immediately to perform an update (e.g., a registration update). In some cases, a data activity may occur after the local release and the UE 115-a may reestablish the subscription 205-a in a connected state. Each time the UE 115-a reestablishes the subscription 205-a in a connected state (e.g., from an idle state), the UE 115-a and the base station 105-a may reset access stratum (AS) security, non-access stratum (NAS) security, or both, and the base station 105-a may reintroduce the context of the connection to the UE 115-a. In doing so, the UE 115-a and the base station 105-a may experience a power penalty and an increased signaling load. Additionally or alternatively, the UE 115-a may experience increased latency until the actual data transfer is completed as the connected state may be setup from scratch. Increased latency and increased signaling loads may cause the subscription 205-a to use available radio resources with a higher priority until the signaling is complete and background traffic may begin, which may affect the performance of the subscription 205-b in terms of radio resource management. In some examples, the UE 115-a may switch to an idle state (e.g., RRC_IDLE) after receiving the release from the base station 105-a and after a data activity ends. If there is more data activity, the UE 115-a may move to a connected state and may likewise experience a power penalty, an increased signaling load, latency, and tuneaway of the subscription 205-b (e.g., the subscription 205-b may release resources for the subscription 205-a to use).

The UE 115-a may inform the base station 105-a about a preference of the UE 115-a for some behavior, for example, a preference to transition to an inactive state (e.g., RRC_INACTIVE) after a release from the base station 105-a. The UE 115-a may use this mechanism to enable power savings, reduced latency, and reduced signaling loads. In some cases, with UAI, the UE 115-a may request for the base station 105-a to move the UE 115-a (e.g., using the subscription 205-a) to the inactive state when the UE 115-a detects a period of data inactivity. Upon moving to the inactive state, as opposed to moving to an idle state, the UE 115-a and the base station 105-a may allow for a faster resumption to the connected state with lower latency and a lower signaling load between the UE 115-a and the base station 105-a. In some cases, the subscription 205-b (e.g., the other subscription in a single radio design) may benefit as the UE 115-a may be able to transition the subscription 205-a to the connected state faster, such that radio resources may be freed for the subscription 205-b. The minimized radio resource consumption at the UE 115-a may also lead to power savings.

In some cases, the UE 115-a may establish a connection with a base station 105-a via the communications link 210, and the subscription 205-a may be in a connected state (e.g., RRC_CONNECTED). The UE 115-a may use the subscription 205-a to perform a communication activity 215 (e.g., a data activity) with the base station 105-a while the subscription 205-a is in the connected state. Upon completion of the data activity, the UE 115-a may indicate a preference of the UE 115-a to the base station 105-a to switch the subscription 205-a from a connected state to an inactive state (e.g., RRC_INACTIVE), for example as opposed to switching the subscription to an idle state (e.g., RRC_IDLE). In some cases, the UE 115-a may indicate the preference of the UE 115-a in a UAI message 220 (e.g., releasePreference-r16 IE in UAI OTA) in response to a release message from the base station. In some examples, as soon as there is no data activity occurring at the UE 115-a, the UE 115-a may immediately transmit the UAI to the base station to indicate the UE 115-a preference. If the base station 105-a has to send data, the base station 105-a may delay sending the release. Additionally or alternatively, if the UE 115-a moves to an inactive state and a subsequent uplink data activity is triggered, transitioning the subscription 205-a from the inactive state to the connected state may be less power and resource expensive as compared to transitioning the subscription 205-a from the idle state to the connected state.

Figure 3:
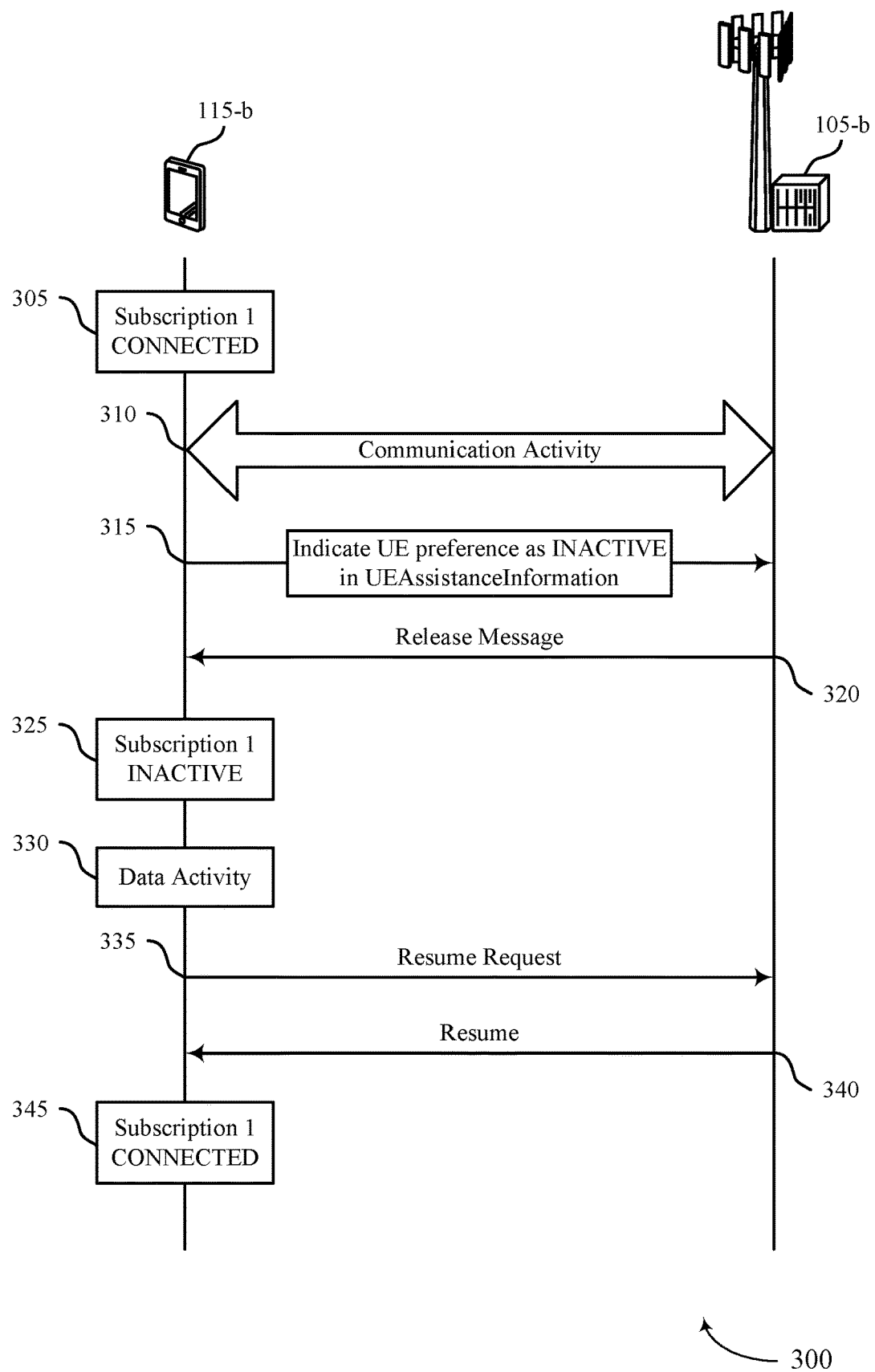
FIG. 3 illustrates an example of a process flow that supports preference signaling for a multi-subscription wireless device in accordance with aspects of the present disclosure.

FIG. 3 illustrates an example of a process flow 300 that supports preference signaling for a multi-subscription wireless device in accordance with aspects of the present disclosure. The process flow 300 may implement aspects of wireless communications systems 100 and 200, or may be implemented by aspects of the wireless communications system 100 and 200. For example, the process flow 300 may illustrate operations between a UE 115-b and a base station 105-b, which may be examples of corresponding devices described with reference to FIGS. 1 and 2. In the following description of the process flow 300, the operations between the UE 115-b and the base station 105-b may be transmitted in a different order than the example order shown, or the operations performed by the UE 115-b and the base station 105-b may be performed in different orders or at different times. Some operations may also be omitted from the process flow 300, and other operations may be added to the process flow 300.

In some examples, an MSIM wireless device (e.g., the UE 115-b) may use preference signaling to achieve improved power efficiency, improved throughput, lower latency, or other performance benefits for communications with the base station 105-b. The UE 115-b may be associated with a subscription 1 and a subscription 2, where, for example, the subscription 1 may correspond to an nDDS and the subscription 2 may correspond to a DDS. At 305, the UE 115-b may establish a connection with the base station 105-b such that the subscription 1 is in a connected state (e.g., RRC_CONNECTED). In some cases, at 310, the UE 115-b may use the subscription 1 to perform a communication activity (e.g., a data activity) with the base station 105-b while the subscription 1 is in the connected state.

At 315, based on the completion of the communication activity, the UE 115-b may transmit, to the base station 105-b, a message including UAI which may indicate a preference of the UE 115-b to enter an inactive state (e.g., RRC_INACTIVE). The preference may be indicated in an information element (IE) of the UAI (e.g., releasePreference-r16 IE). For example, the UAI may include an indication of a preference of the UE 115-b to switch the subscription 1 from the connected state to the inactive state in response to a release message from the base station 105-b. As such, based on this preference, the base station 105-b may trigger the UE 115-b to switch to an inactive state when a data activity is over for the subscription 1.

At 320, the UE 115-b may receive the release message from the base station 105-b after the UE 115-b transmits the UAI. The release message may indicate for the UE 115-b to switch the subscription 1 to the inactive state following the preference of the UE 115-b. In some cases, the release message may indicate for the UE 115-b to suspend a configuration it may have used for the communication activity.

At 325, the UE 115-b may switch the subscription 1 from the connected state to the inactive state based on receiving the release message from the base station 105-b. In some examples, the UE 115-b the base station 105-b may trigger the UE 115-b to enter an inactive state based on a lack of communication activities (e.g., data transmissions) for some period of time. In the inactive state, the UE 115-b may refrain from maintaining active connections with the base station 105-*b*, but may maintain some context (e.g., of a configuration) that may have been previously established with the base station 105-*b*. That is, the UE 115-*b* may remember a previous configuration it may have established with the base station 105-*b* when in the inactive state. By retaining the context, the UE 115-*b* and the base station 105-*b* may refrain from reestablishing a connection request and security (e.g., AS and NAS security) if the UE 115-*b* switches back from the inactive state to a connected state.

At 330, the UE 115-*b* may identify an additional data activity while the subscription 1 is in the inactive state. At 335, the UE 115-*b* may transmit, to the base station 105-*b*, a request to resume the connection (e.g., transition the subscription 1 from the inactive state to the connected state) based on the additional communication activity.

At 340, the UE 115-*b* may receive, from the base station 105-*b*, a resume message indicating for the UE 115-*b* to resume the connection (e.g., transition the subscription 1 from the inactive state to the connected state) after transmitting the request to resume the connection. In some examples, because the UE 115-*b* maintained context from the initial connected state with the base station 105-*b*, the UE 115-*b* and the base station 105-*b* may refrain from communicating additional signaling after the base station 105-*b* transmits the resume message. At 345, the UE 115-*b* may switch the subscription 1 from the inactive state to the connected state based on receiving the resume message from the base station 105-*b*.

Figure 4:
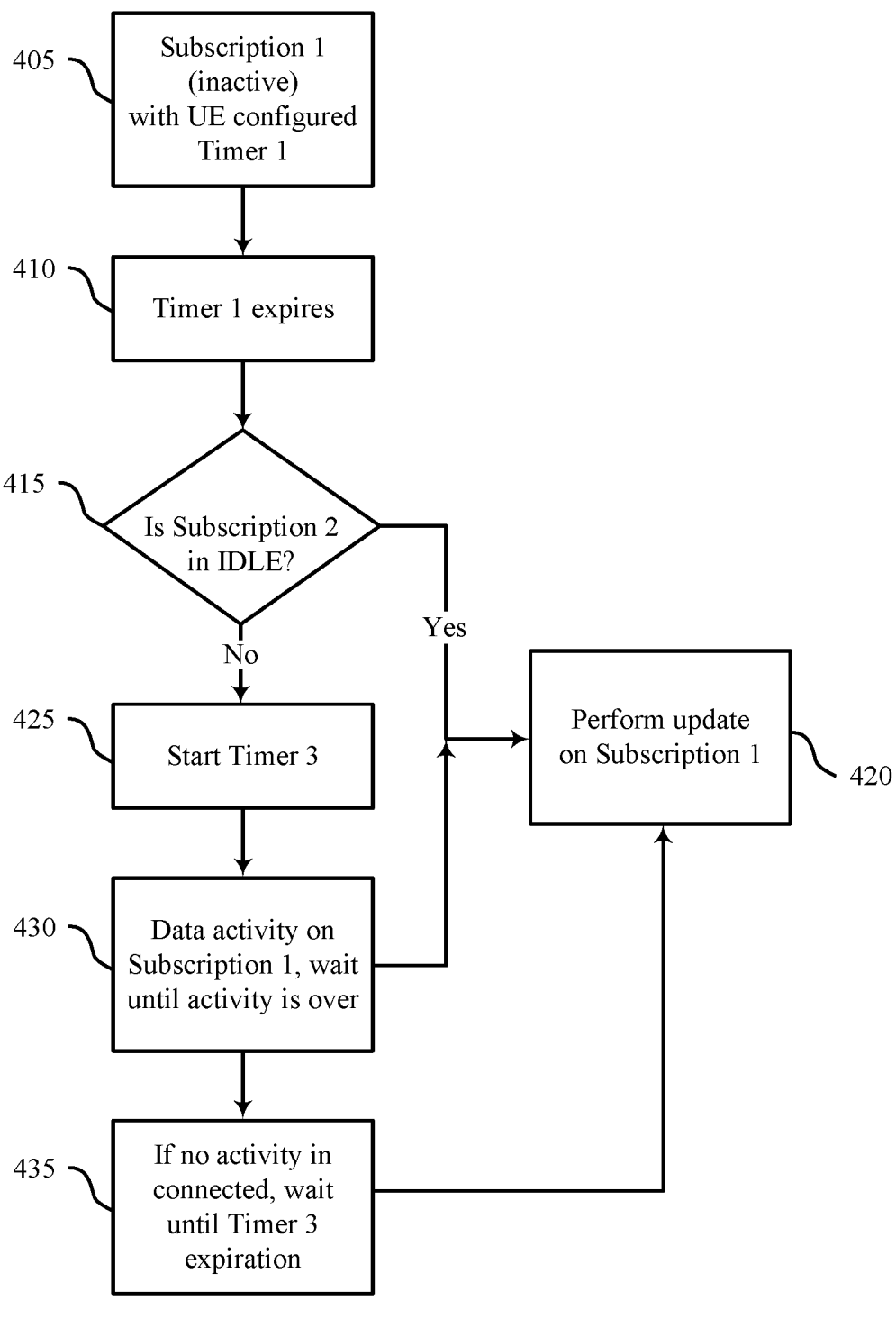
FIG. 4 illustrates an example of a block diagram that supports preference signaling for a multi-subscription wireless device in accordance with aspects of the present disclosure.

FIG. 4 illustrates an example of a block diagram 400 that supports preference signaling for a multi-subscription wireless device in accordance with aspects of the present disclosure. The block diagram 400 may implement aspects of wireless communications systems 100 and 200, or may be implemented by aspects of the wireless communications system 100 and 200. In the following description of the block diagram 400, the operations may occur in a different order than the example order shown, or the operations may be performed (e.g., by a UE and a base station) in different orders or at different times. Some operations may also be omitted from the block diagram 400, and other operations may be added to the block diagram 400.

A multi-subscription wireless device (e.g., a UE) may use preference signaling to achieve improved power efficiency, improved throughput, lower latency, or other performance benefits. In some cases, the UE may be associated with a subscription 1 and a subscription 2, where the subscription 1 may correspond to an nDDS and the subscription 2 may correspond to a DDS. The UE may establish a connection with a base station such that the subscription 1 is in a connected state (e.g., RRC_CONNECTED), and the UE may use the subscription 1 to perform a communication activity (e.g., a data activity) with the base station while the subscription 1 is in the connected state. Upon completion of the data activity, the UE may indicate a preference of the UE to the base station to switch an subscription 1 from a connected state to an inactive state (e.g., RRC_INACTIVE), for example as opposed to switching the subscription 1 to an idle state (e.g., RRC_IDLE). In some cases, the UE may indicate the preference of the UE in a UAI message in response to a release message from the base station.

In some cases, after entering the subscription 1 into inactive state, the UE may have to transition the subscription 1 at one or more times to the connected state, such as to perform an update procedure for the subscription 1. For example, the UE may have to periodically transition to the connected state to perform a radio access network (RAN)-based notification area update (RNAU) procedure for the subscription 1. As part of an RNAU procedure, the UE may report its location to the network while connected via the subscription 1. Such transitions of the subscription 1 to the connected state may cause disruptions for the subscription 2 as the subscription 1 may use the available radio resources to perform signaling associated with the update procedure. In some cases, the update procedure and transition from the inactive state to the connected state may be controlled by the base station via a timer (e.g., an RRC T380 timer) indicated in the release message. For example, as soon as the UE enters the inactive state, the base station may start the timer (e.g., a timer 2). The timer 2 may be periodic such that the UE may enter the connected state once the timer 2 expires. The UE may also report a periodic resume update to the base station to indicate that the UE is maintaining the context of a previous connected state.

In some examples, the base station may configure the timer 2 to have some duration, and upon an expiration of the timer 2, the UE may switch the subscription 1 from the inactive state to the connected state to perform the update procedure. In some cases, the UE may use one or more timers with durations different than the base station-configured timer duration, or the UE may indicate (e.g., in the UAI) a preference for an extended duration of the timer 2 configured by the base station.

In some cases, the timer 2 may be longer than a timer 1 configured by the UE (e.g., T2>T1, where T2=5 minutes and T1=4 minutes). The subscription 1 may trigger the update procedure such that when the timer 2 expires (e.g., at the end of 5 minutes), the subscription 1 may enter the connected state. While in the connected state, the subscription 1 may participate in a data activity such as a high quality of service (QoS) activity, a high priority activity, and the like. In some cases, the UE may indicate to the base station to transition the subscription 1 to the connected state when the timer 1 expires (e.g., at the end of 4 minutes) instead of when the timer 2 expires (e.g., at the end of 5 minutes) so as to refrain from interrupting the subscription 2. As such, the UE may trigger the update procedure early.

In some examples, at 405, the UE may initiate the timer 1 (e.g., the timer configured by the UE) and the base station may initiate the timer 2 while the subscription 1 may be in an inactive state. The UE may determine the duration of the timer 1 by subtracting a small amount of time from the timer 2 (e.g., such that the timer 1 is slightly shorter than the timer 2). At 410, the timer 1 may expire.

At 415, after the expiration of the timer 1, the UE may evaluate whether to trigger the update procedure before the expiration of the timer 2 to reduce the impact on the subscription 2. For example, the UE may check one or more conditions of the subscription 2, such as whether the subscription 2 is in a connected state with an ongoing data activity (e.g., a high QoS activity), whether the subscription 2 is in a connected state but in a connected discontinuous reception (CDRX) sleep mode with no ongoing activity, or whether the subscription 2 is in an idle state.

At 415, the UE may determine that the subscription 2 is in an idle state without an ongoing high priority data activity. Because the subscription 2 is in the idle state, at 420, the UE may trigger the update on the subscription 1 (e.g., while the subscription 1 is in the connected state). In some cases, the UE may also trigger the update on the subscription 1 if the subscription 2 is in the CDRX sleep mode as no activity may occur despite the subscription 2 being in a connected state.

At 425, the UE may determine that the subscription 2 is in a connected state and may be performing a data activity (e.g., a high priority QoS activity). Based on the subscription 2 being in the connected state, and after the expiration of the timer 1 and the timer 2, the UE may start a timer 3 (e.g., T3, where T3=T2−T1 and T3=1 minute). In other words, the UE may extent the timer 2 by T3 seconds after the timer 2 expires. If the subscription 1 switches to an idle state while the timer 3 is running, the UE may perform the update procedure on the subscription 1 at 420.

At 430, the UE may identify a data activity on the subscription 1, and therefore may wait until the data activity is over to perform the update procedure on the subscription 1 at 420. For example, if a high priority activity is still ongoing after timer 3 expires, the UE may wait until the activity is over before performing the update procedure on the subscription 1 at 420.

At 435, the UE may determine that the data activity is over for the subscription 2, but the subscription 2 may remain in the connected state. In such cases, the UE may wait until the timer 3 expires to perform the update procedure on the subscription 1 at 420. As such, the UE may refrain from performing the update procedure on the subscription 1 until either the data activity on the subscription 2 is completed, until the expiration of the timer 3, or a combination thereof.

Figure 5:
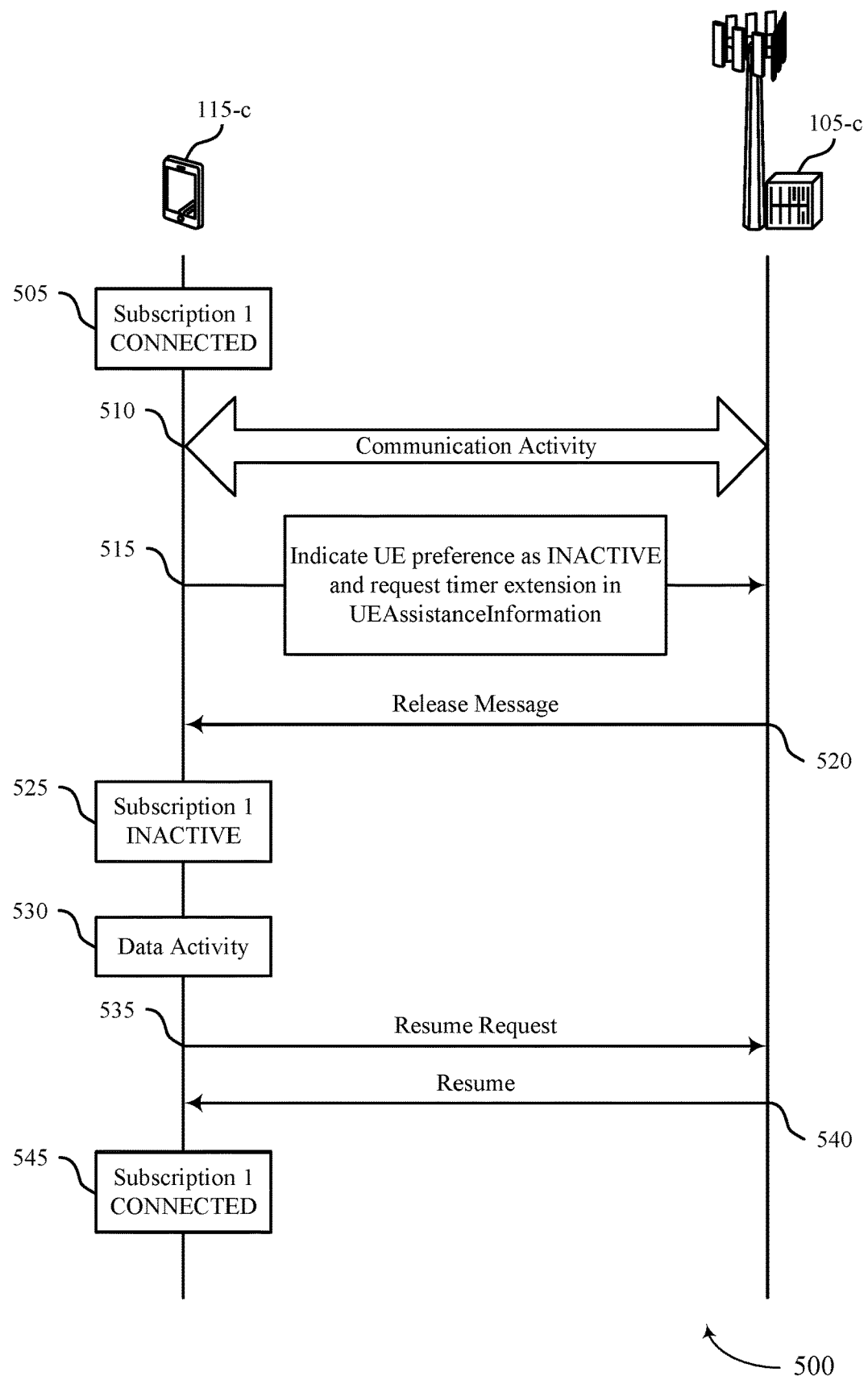
FIG. 5 illustrates an example of a process flow that supports preference signaling for a multi-subscription wireless device in accordance with aspects of the present disclosure.

FIG. 5 illustrates an example of a process flow 500 that supports preference signaling for a multi-subscription wireless device in accordance with aspects of the present disclosure. The process flow 500 may implement aspects of wireless communications systems 100 and 200, or may be implemented by aspects of the wireless communications system 100 and 200. For example, the process flow 300 may illustrate operations between a UE 115-c and a base station 105-c, which may be examples of corresponding devices described with reference to FIGS. 1 and 2. In the following description of the process flow 500, the operations between the UE 115-c and the base station 105-c may be transmitted in a different order than the example order shown, or the operations performed by the UE 115-c and the base station 105-c may be performed in different orders or at different times. Some operations may also be omitted from the process flow 500, and other operations may be added to the process flow 500.

In some examples, as described with reference to FIG. 4, the UE 115-c may periodically transition the subscription 1 from an inactive state to a connected state to perform a procedure (e.g., an RNAU or other update procedure) on the subscription 1. To reduce the impacts of this transition on the subscription 2, the base station 105-c may configure a timer (e.g., a timer 2) to have some duration, and upon an expiration of the timer 2, the UE 115-c may switch the subscription 1 to the connected state to perform the procedure. In some cases, the UE 115-c may use one or more timers with durations different than the timer duration configured by the base station 105-c (e.g., a timer 1 with a shorter duration than the timer 2, a timer 3 with a duration equal to the difference between the durations of the timer 2 and the timer 1). Additionally or alternatively, the UE 115-c may indicate (e.g., in the UAI) a preference for an extended duration of the timer 2.

As described with reference to FIG. 3, at 505, the UE 115-c may establish a connection with the base station 105-c such that the subscription 1 is in a connected state (e.g., RRC_CONNECTED). At 510, the UE 115-c may use the subscription 1 to perform a communication activity (e.g., a data activity) with the base station 105-c while the subscription 1 is in the connected state.

At 515, based on the completion of the communication activity, the UE 115-c may transmit, to the base station 105-c, a message including UAI which may indicate a preference of the UE 115-c to enter an inactive state (e.g., RRC_INACTIVE). The preference may be indicated in an IE of the UAI (e.g., releasePreference-r16 IE). In some cases, the UE 115-c may also (e.g., through inclusion in the UAI of an additional IE) indicate to the base station 105-c a preference of the UE 115-c for an extended duration of the timer 2 (e.g., the T380 timer configured by the base station 105-c). For example, two or more durations of the timer 2 may be supported by the base station 105-c, including a first (e.g., default) duration that may be shorter than a second (e.g., extended) duration, and the UE 115-c may indicate a preference for the second (e.g., extended) duration.

In some cases, by extending the timer 2, the UE 115-c may reduce the impact on the subscription 2 while performing the procedure on the subscription 1 as described with reference to FIG. 4. In some cases, the UE 115-c may indicate the preference to extend the timer 2, the UE 115-c may introduce the timer 1 and the timer 3, or a combination thereof. In some cases, by indicating the preference to extend the timer 2, the UE 115-c may decrease the time to transition the subscription 1 from the inactive state to the connected state, which may increase power savings at the UE 115-c, reduce signaling loads at the UE 115-c, and minimize the disruption to the subscription 2. In some cases, the described performance benefits may apply to URLLC or low-power devices where the base station 105-c may configure the UE 115-c to transition to the inactive state.

At 520, the UE 115-c may receive the release message from the base station 105-c after the UE 115-c transmits the UAI. The release message may indicate for the UE 115-c to switch the subscription 1 to the inactive state following the preference of the UE 115-c. At 525, the UE 115-c may switch the subscription 1 from the connected state to the inactive state based on receiving the release message from the base station 105-c. In some examples, the base station 105-c may trigger the UE 115-c to enter an inactive state based on a lack of communication activities (e.g., data transmissions) for some period of time.

At 530, the UE 115-c may identify an additional data activity while the subscription 1 is in the inactive state. At 535, the UE 115-c may transmit, to the base station 105-c, a request to resume the connection (e.g., transition the subscription 1 from the inactive state to the connected state) based on the additional communication activity. At 540, the UE 115-c may receive, from the base station 105-c, a resume message indicating for the UE 115-c to resume the connection (e.g., transition the subscription 1 from the inactive state to the connected state) after transmitting the request to resume the connection.

Figure 6:
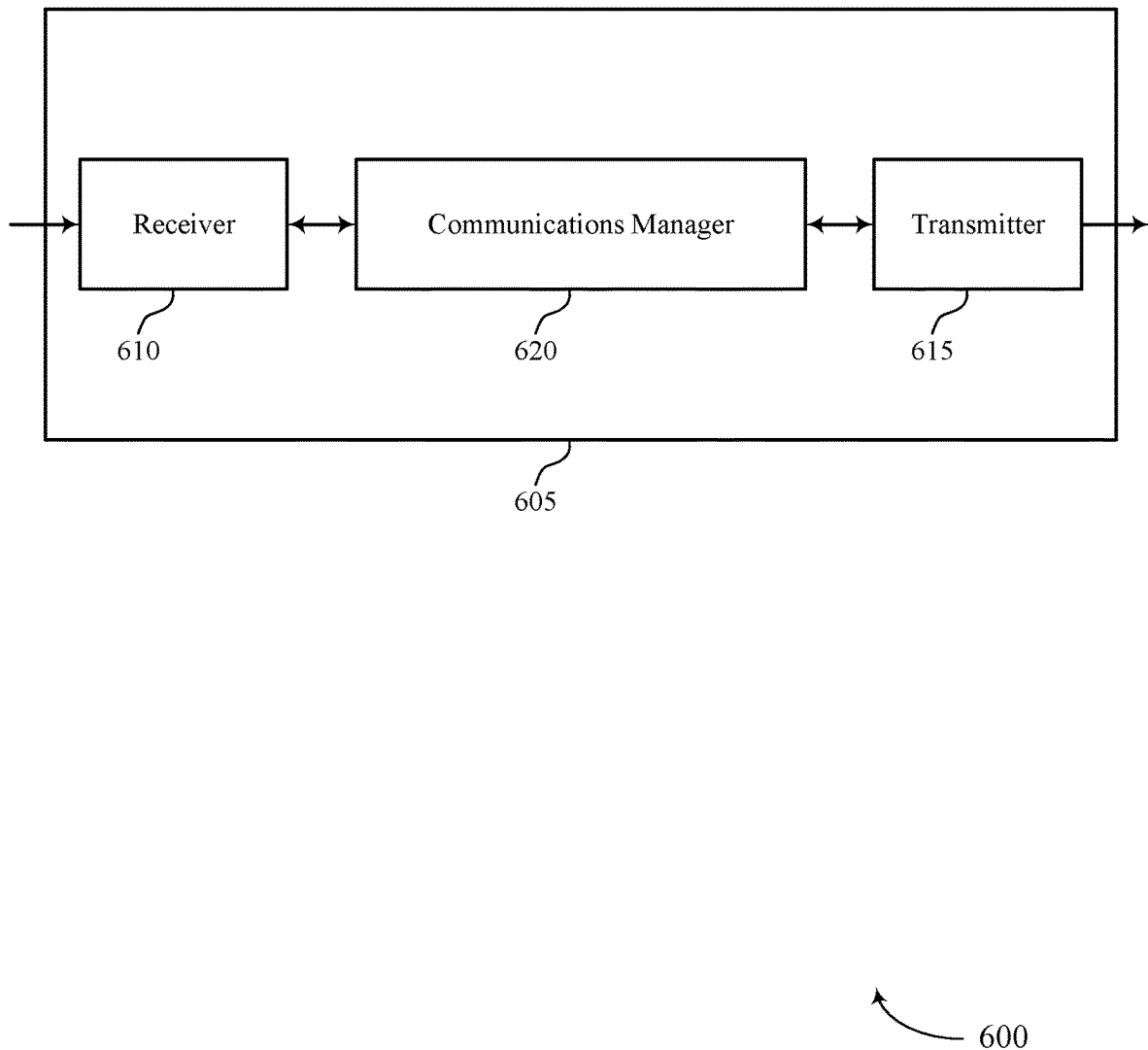
FIGS. 6 and 7 show block diagrams of devices that support preference signaling for a multi-subscription wireless device in accordance with aspects of the present disclosure.

FIG. 6 shows a block diagram 600 of a device 605 that supports preference signaling for a multi-subscription wireless device in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to preference signaling for a multi-subscription wireless device). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to preference signaling for a multi-subscription wireless device). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of preference signaling for a multi-subscription wireless device as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for establishing a connection with a base station, where the UE is associated with a DDS and an nDDS, and where the nDDS is in a connected state after the connection is established. The communications manager 620 may be configured as or otherwise support a means for using the nDDS to perform a communication activity with the base station while the nDDS is in the connected state. The communications manager 620 may be configured as or otherwise support a means for transmitting, to the base station and based on a completion of the communication activity, a UAI message including an indication of a preference of the UE to switch, in response to a release message from the base station, the nDDS from the connected state to an inactive state.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for preference signaling for an MSIM device, which may reduce latency and reduce power consumption. The techniques described herein may further reduce power consumption and signaling loads while switching a subscription between a connected state and an idle state.

Figure 7:
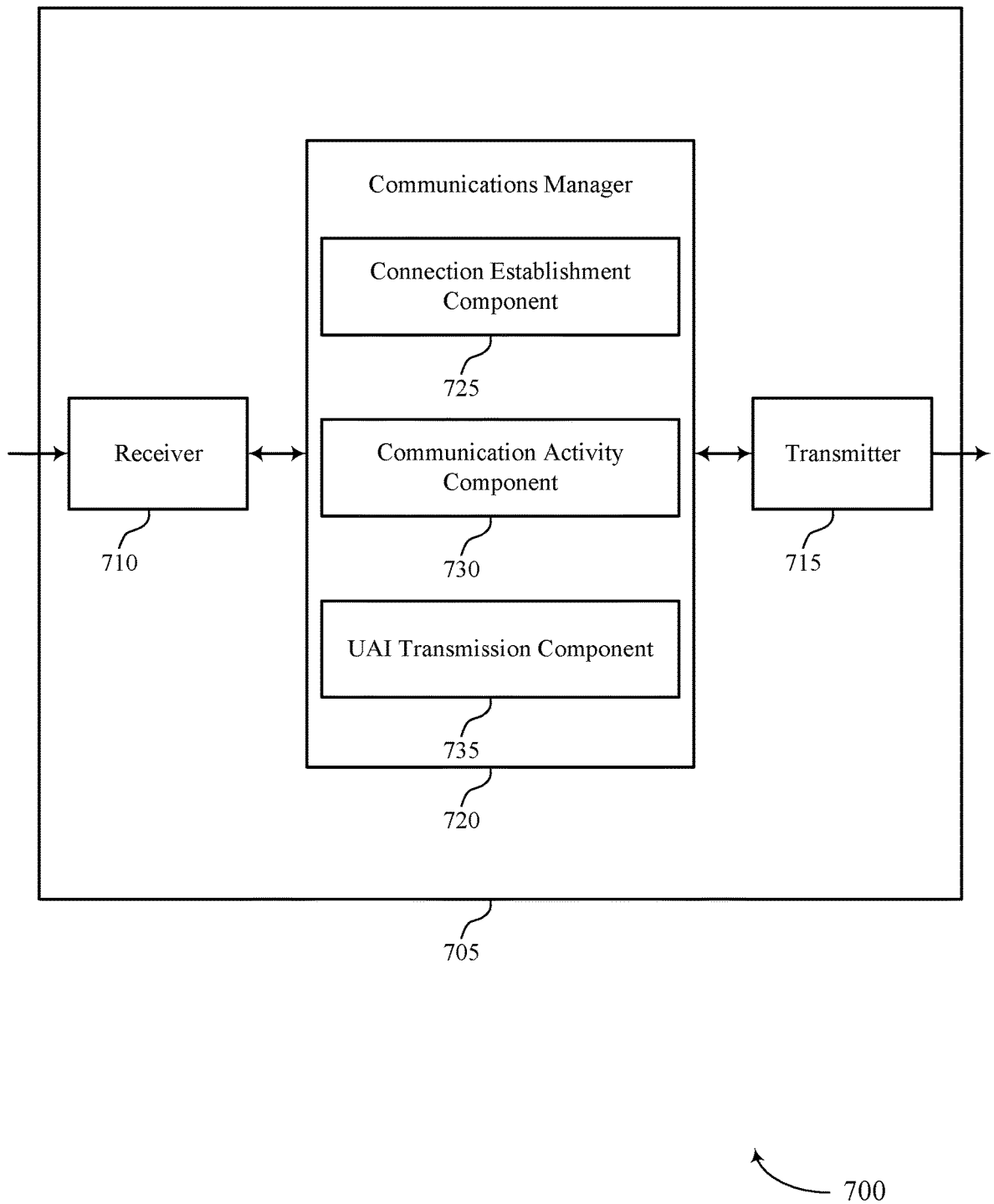

FIG. 7 shows a block diagram 700 of a device 705 that supports preference signaling for a multi-subscription wireless device in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to preference signaling for a multi-subscription wireless device). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to preference signaling for a multi-subscription wireless device). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of preference signaling for a multi-subscription wireless device as described herein. For example, the communications manager 720 may include a connection establishment component 725, a communication activity component 730, a UAI transmission component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The connection establishment component 725 may be configured as or otherwise support a means for establishing a connection with a base station, where the UE is associated with a DDS and an nDDS, and where the nDDS is in a connected state after the connection is established. The communication activity component 730 may be configured as or otherwise support a means for using the nDDS to perform a communication activity with the base station while the nDDS is in the connected state. The UAI transmission component 735 may be configured as or otherwise support a means for transmitting, to the base station and based on a completion of the communication activity, a UAI message including an indication of a preference of the UE to switch, in response to a release message from the base station, the nDDS from the connected state to an inactive state.

Figure 8:
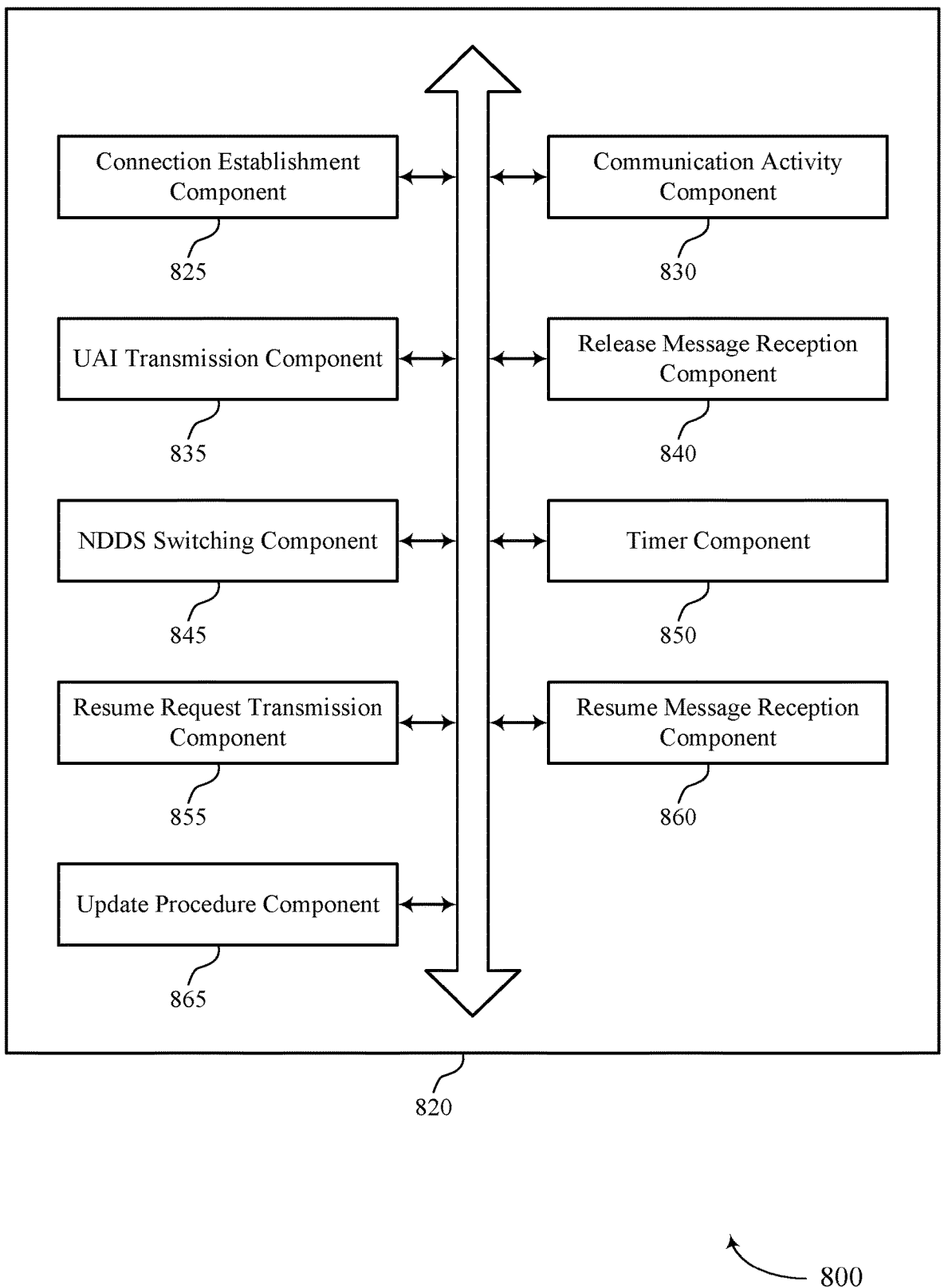
FIG. 8 shows a block diagram of a communications manager that supports preference signaling for a multi-subscription wireless device in accordance with aspects of the present disclosure.

FIG. 8 shows a block diagram 800 of a communications manager 820 that supports preference signaling for a multi-subscription wireless device in accordance with aspects of the present disclosure. The communications manager 820 may be an example of aspects of a communications manager 620, a communications manager 720, or both, as described herein. The communications manager 820, or various components thereof, may be an example of means for performing various aspects of preference signaling for a multi-subscription wireless device as described herein. For example, the communications manager 820 may include a connection establishment component 825, a communication activity component 830, a UAI transmission component 835, a release message reception component 840, a nDDS switching component 845, a timer component 850, a resume request transmission component 855, a resume message reception component 860, an update procedure component 865, or any combination thereof. Each of these components may communicate, directly or indirectly, with one another (e.g., via one or more buses).

The communications manager 820 may support wireless communication at a UE in accordance with examples as disclosed herein. The connection establishment component 825 may be configured as or otherwise support a means for establishing a connection with a base station, where the UE is associated with a DDS and an nDDS, and where the nDDS is in a connected state after the connection is established. The communication activity component 830 may be configured as or otherwise support a means for using the nDDS to perform a communication activity with the base station while the nDDS is in the connected state. The UAI transmission component 835 may be configured as or otherwise support a means for transmitting, to the base station and based on a completion of the communication activity, a UAI message, including an indication of a preference of the UE to switch, in response to a release message from the base station, the nDDS from the connected state to an inactive state.

In some examples, the release message reception component 840 may be configured as or otherwise support a means for receiving the release message from the base station after transmitting the UAI, where the release message indicates for the UE to switch the nDDS to the inactive state. In some examples, the nDDS switching component 845 may be configured as or otherwise support a means for switching the nDDS from the connected state to the inactive state based on receiving the release message. In some examples, the release message includes an RRC release message.

In some examples, the resume request transmission component 855 may be configured as or otherwise support a means for transmitting, to the base station, a request to resume the connection based on an additional communication activity for the nDDS. In some examples, the resume message reception component 860 may be configured as or otherwise support a means for receiving, from the base station after transmitting the request to resume the connection, a resume message indicating for the UE to resume the connection. In some examples, the nDDS switching component 845 may be configured as or otherwise support a means for switching the nDDS from the inactive state to the connected state based on receiving the resume message. In some examples, the communication activity component 830 may be configured as or otherwise support a means for using the nDDS, after receiving the resume message, to perform the additional communication activity with the base station while the nDDS is in the connected state.

In some examples, the update procedure component 865 may be configured as or otherwise support a means for receiving, from the base station, an indication of a first duration of a first timer, where an expiration of the first timer is associated with the UE performing an RNAU procedure after switching the nDDS from the connected state to the inactive state. In some examples, the timer component 850 may be configured as or otherwise support a means for configuring a second timer with a second duration shorter than the first duration. In some examples, the nDDS switching component 845 may be configured as or otherwise support a means for initiating the second timer based on switching the nDDS from the connected state to the inactive state. In some examples, the timer component 850 may be configured as or otherwise support a means for evaluating a status of the DDS based on an expiration of the second timer. In some examples, the update procedure component 865 may be configured as or otherwise support a means for performing the RNAU procedure at a time that is based on the status of the DDS.

In some examples, the timer component 850 may be configured as or otherwise support a means for initiating a third timer with a third duration based on the status of the DDS including the DDS being in the connected state and engaged in a second communication activity. In some examples, the timer component 850 may be configured as or otherwise support a means for monitoring the status of the DDS after reinitiating the second timer and before an expiration of the third timer.

In some examples, the update procedure component 865 may be configured as or otherwise support a means for detecting a switch of the DDS from the connected state to an idle state based on monitoring the status of the DDS, where performing the RNAU procedure is based on the switch of the DDS from the connected state to the idle state, and where the time is independent of a value of the third timer.

In some examples, the timer component 850 may be configured as or otherwise support a means for continuing to monitor the status of the DDS after the expiration of the third timer based on the DDS being in the connected state and engaged in the second communication activity throughout the third duration. In some examples, the update procedure component 865 may be configured as or otherwise support a means for detecting a cessation of the second communication activity based on continuing to monitor the status of the DDS, where performing the RNAU procedure is based on the cessation of the second communication activity, and where the time is after the expiration of the third timer.

In some examples, the update procedure component 865 may be configured as or otherwise support a means for detecting a cessation of the second communication activity based on monitoring the status of the DDS, where performing the RNAU procedure is based on the cessation of the second communication activity, and where the time is before the expiration of the third timer. In some examples, the third duration is equal to a difference between the first duration and the second duration.

In some examples, the timer component 850 may be configured as or otherwise support a means for initiating a third timer with a third duration based on the status of the DDS including the DDS being in the connected state with no ongoing activity, where performing the RNAU procedure is based on the DDS being in the connected state with no ongoing activity, and where the time is no earlier than the expiration of the third timer. In some examples, the third duration is equal to a difference between the first duration and the second duration.

In some examples, based on the status of the DDS including the DDS being in an idle state, the time corresponds to an earliest opportunity of the UE after evaluating the status of the DDS.

In some examples, a duration between initiating the second timer and the time is less than the first duration.

In some examples, the timer component 850 may be configured as or otherwise support a means for transmitting, to the base station, an indication of a second preference of the UE for an extended duration of a timer associated with the UE performing an RNAU procedure after switching the nDDS from the connected state to the inactive state, the extended duration longer than a default duration of the timer. In some examples, the indication of the second preference is transmitted as part of the UAI.

In some examples, the preference of the UE to switch the nDDS from the connected state to the inactive state in response to the release message from the base station includes a preference to not switch the nDDS to an idle state in response to the release message.

Figure 9:
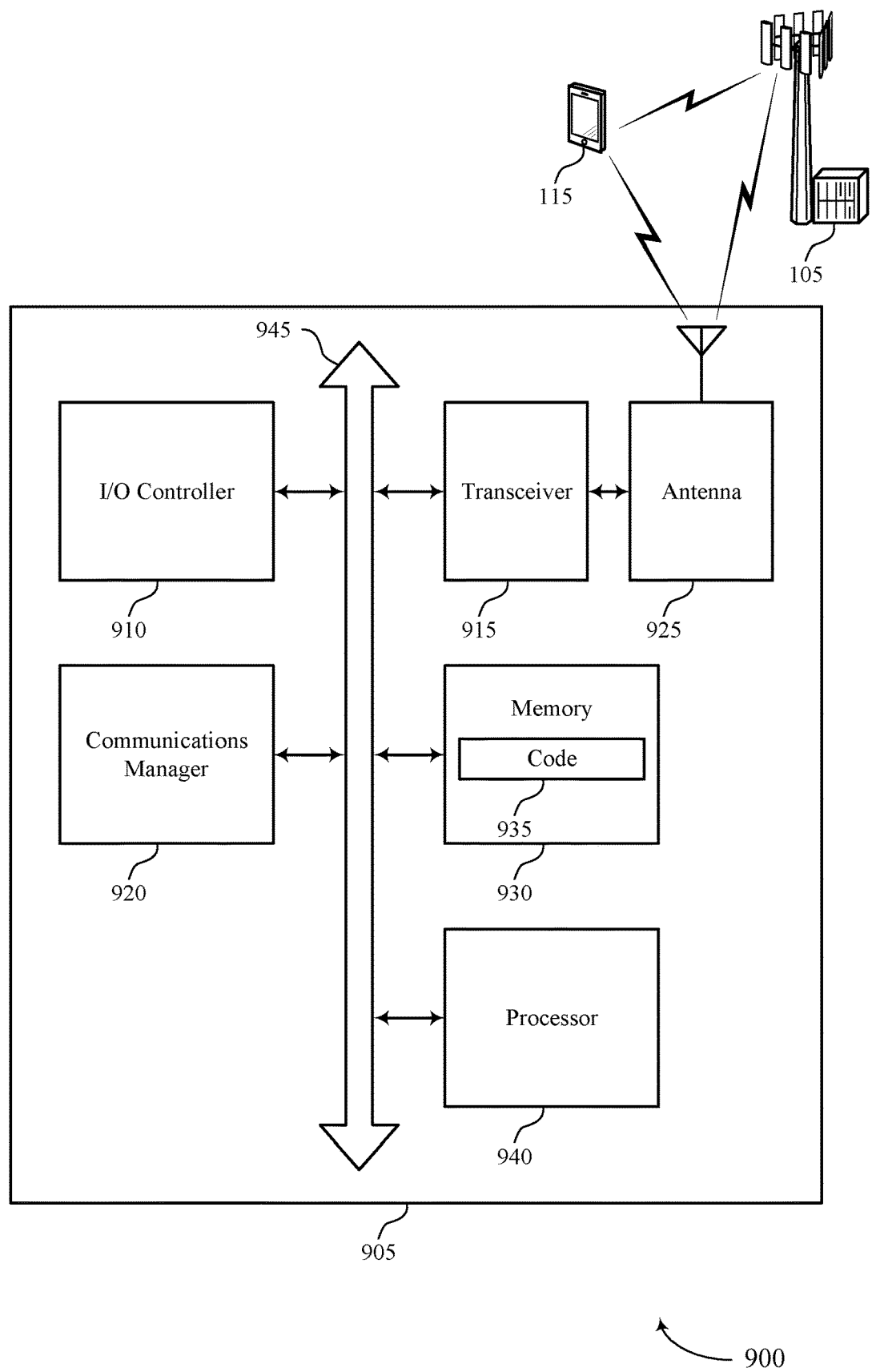
FIG. 9 shows a diagram of a system including a device that supports preference signaling for a multi-subscription wireless device in accordance with aspects of the present disclosure.

FIG. 9 shows a diagram of a system 900 including a device 905 that supports preference signaling for a multi-subscription wireless device in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting preference signaling for a multi-subscription wireless device). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for establishing a connection with a base station, where the UE is associated with a DDS and an nDDS, and where the nDDS is in a connected state after the connection is established. The communications manager 920 may be configured as or otherwise support a means for using the nDDS to perform a communication activity with the base station while the nDDS is in the connected state. The communications manager 920 may be configured as or otherwise support a means for transmitting, to the base station and based on a completion of the communication activity, a UAI message including an indication of a preference of the UE to switch, in response to a release message from the base station, the nDDS from the connected state to an inactive state.

By including or configuring the communications manager 920 in accordance with examples as described herein, the device 905 may support techniques for preference signaling for an MSIM device, which may reduce latency and reduce power consumption. The techniques described herein may further reduce power consumption and signaling loads while switching a subscription between a connected state and an idle state.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of preference signaling for a multi-subscription wireless device as described herein, or the processor 940 and the memory 930 may be otherwise configured to perform or support such operations.

Figure 10:
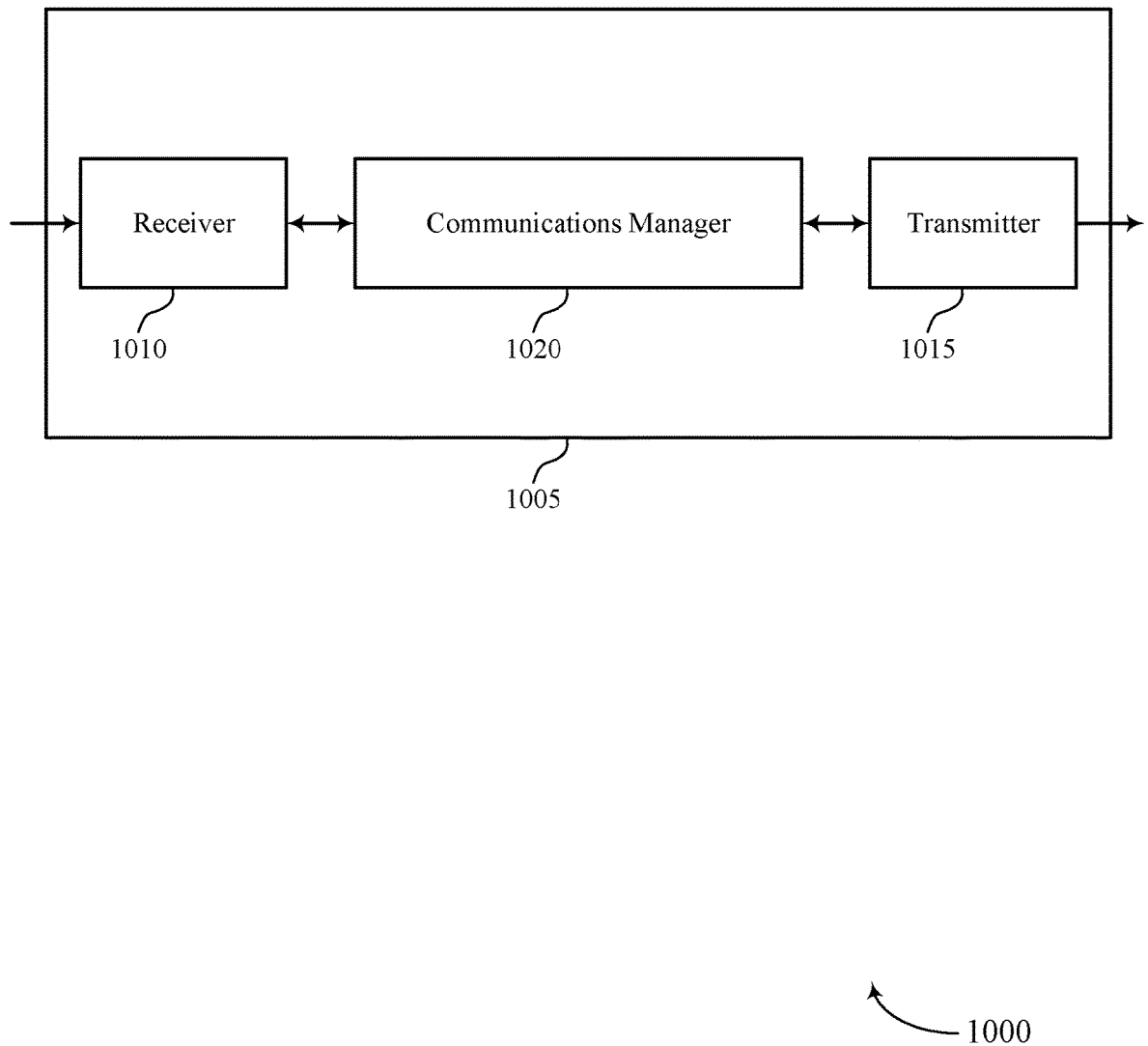
FIGS. 10 and 11 show block diagrams of devices that support preference signaling for a multi-subscription wireless device in accordance with aspects of the present disclosure.

FIG. 10 shows a block diagram 1000 of a device 1005 that supports preference signaling for a multi-subscription wireless device in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to preference signaling for a multi-subscription wireless device). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to preference signaling for a multi-subscription wireless device). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of preference signaling for a multi-subscription wireless device as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for establishing a connection with a UE, where the UE is associated with a DDS and an nDDS, and where the connection is for the nDDS. The communications manager 1020 may be configured as or otherwise support a means for engaging in a communication activity with the UE using the connection and the nDDS. The communications manager 1020 may be configured as or otherwise support a means for receiving, from the UE and based on a completion of the communication activity, a UAI message including an indication of a preference of the UE to switch the nDDS from a connected state to an inactive state in response to a release message from the base station.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for preference signaling for an MSIM device, which may reduce latency and reduce power consumption. The techniques described herein may further reduce power consumption and signaling loads while switching a subscription between a connected state and an idle state.

Figure 11:
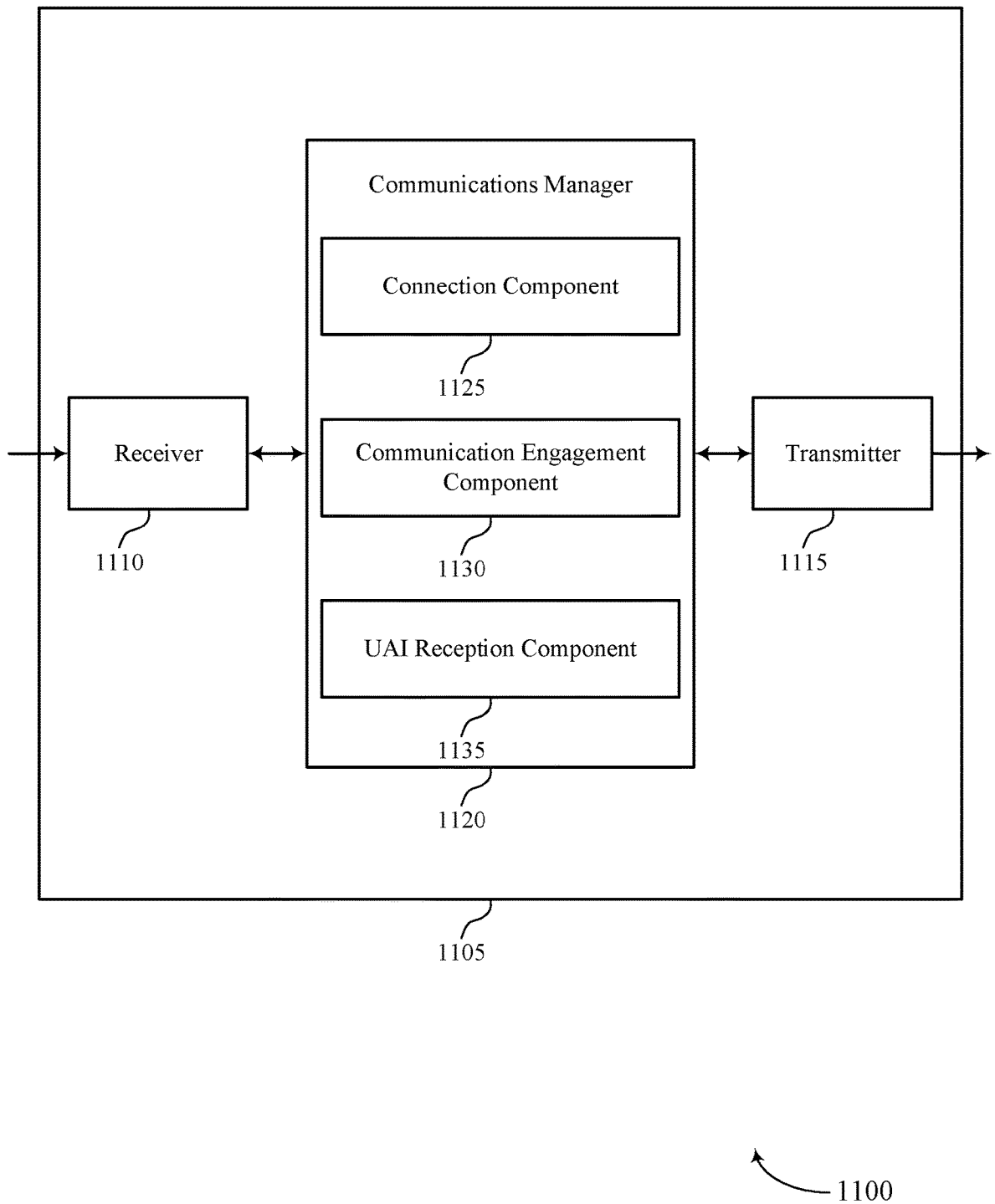

FIG. 11 shows a block diagram 1100 of a device 1105 that supports preference signaling for a multi-subscription wireless device in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to preference signaling for a multi-subscription wireless device). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to preference signaling for a multi-subscription wireless device). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of preference signaling for a multi-subscription wireless device as described herein. For example, the communications manager 1120 may include a connection component 1125, a communication engagement component 1130, a UAI reception component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The connection component 1125 may be configured as or otherwise support a means for establishing a connection with a UE, where the UE is associated with a DDS and an nDDS, and where the connection is for the nDDS. The communication engagement component 1130 may be configured as or otherwise support a means for engaging in a communication activity with the UE using the connection and the nDDS. The UAI reception component 1135 may be configured as or otherwise support a means for receiving, from the UE and based on a completion of the communication activity, a UAI message including an indication of a preference of the UE to switch the nDDS from a connected state to an inactive state in response to a release message from the base station.

Figure 12:
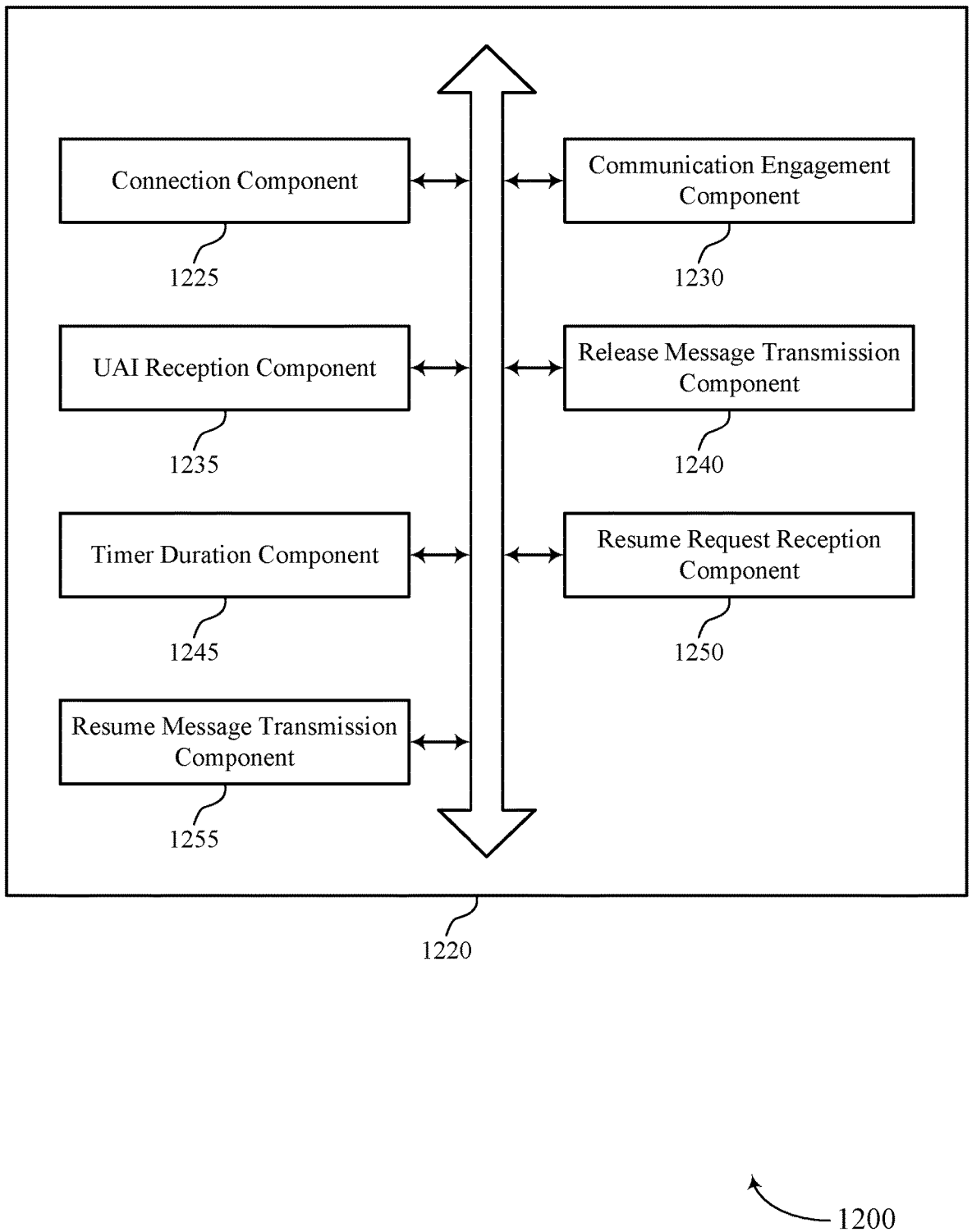
FIG. 12 shows a block diagram of a communications manager that supports preference signaling for a multi-subscription wireless device in accordance with aspects of the present disclosure.

FIG. 12 shows a block diagram 1200 of a communications manager 1220 that supports preference signaling for a multi-subscription wireless device in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of preference signaling for a multi-subscription wireless device as described herein. For example, the communications manager 1220 may include a connection component 1225, a communication engagement component 1230, a UAI reception component 1235, a release message transmission component 1240, a timer duration component 1245, a resume request reception component 1250, a resume message transmission component 1255, or any combination thereof. Each of these components may communicate, directly or indirectly, with one another (e.g., via one or more buses).

The communications manager 1220 may support wireless communication at a base station in accordance with examples as disclosed herein. The connection component 1225 may be configured as or otherwise support a means for establishing a connection with a UE, where the UE is associated with a DDS and an nDDS, and where the connection is for the nDDS. The communication engagement component 1230 may be configured as or otherwise support a means for engaging in a communication activity with the UE using the connection and the nDDS. The UAI reception component 1235 may be configured as or otherwise support a means for receiving, from the UE and based on a completion of the communication activity, a UAI message including an indication of a preference of the UE to switch the nDDS from a connected state to an inactive state in response to a release message from the base station.

In some examples, the release message transmission component 1240 may be configured as or otherwise support a means for transmitting the release message to the UE after receiving the UAI, where the release message indicates for the UE to switch the nDDS to the inactive state. In some examples, the release message includes an RRC release message.

In some examples, the resume request reception component 1250 may be configured as or otherwise support a means for receiving, from the UE, a request to resume the connection. In some examples, the resume message transmission component 1255 may be configured as or otherwise support a means for transmitting, to the UE after receiving the request to resume the connection, a resume message indicating for the UE to resume the connection. In some examples, the communication engagement component 1230 may be configured as or otherwise support a means for engaging, after transmitting the resume message, in an additional communication activity with the UE using the connection and the nDDS.

In some examples, the timer duration component 1245 may be configured as or otherwise support a means for receiving, from the UE, an indication of a second preference of the UE for an extended duration of a timer associated with the UE performing an RNAU procedure after switching the nDDS from the connected state to the inactive state, the extended duration longer than a default duration of the timer. In some examples, the indication of the second preference is received as part of the UAI.

In some examples, the preference of the UE to switch the nDDS to the inactive state in response to the release message from the base station includes a preference to not switch the nDDS to an idle state in response to the release message.

Figure 13:
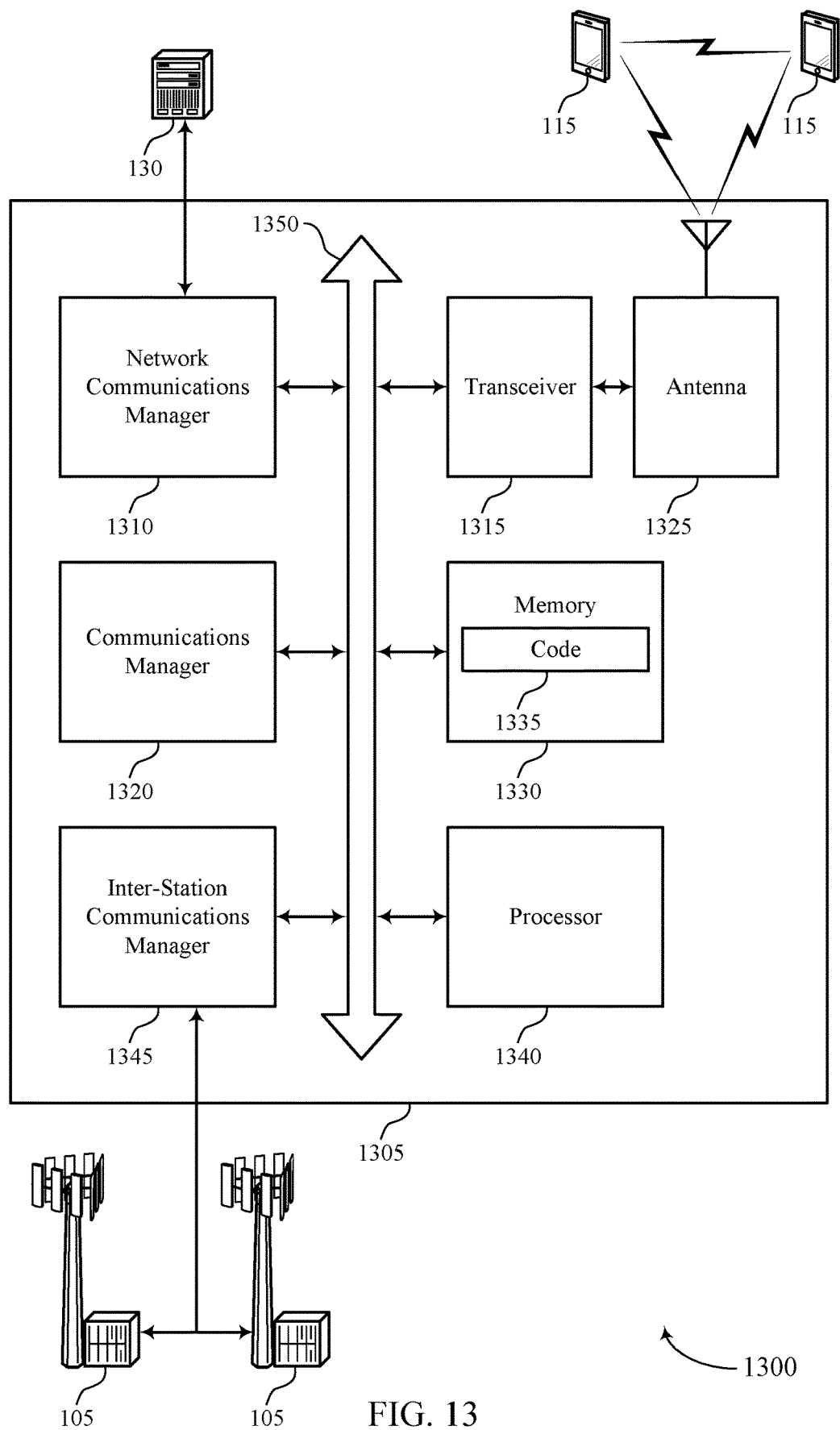
FIG. 13 shows a diagram of a system including a device that supports preference signaling for a multi-subscription wireless device in accordance with aspects of the present disclosure.

FIG. 13 shows a diagram of a system 1300 including a device 1305 that supports preference signaling for a multi-subscription wireless device in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting preference signaling for a multi-subscription wireless device). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for establishing a connection with a UE, where the UE is associated with a DDS and an nDDS, and where the connection is for the nDDS. The communications manager 1320 may be configured as or otherwise support a means for engaging in a communication activity with the UE using the connection and the nDDS. The communications manager 1320 may be configured as or otherwise support a means for receiving, from the UE and based on a completion of the communication activity, a UAI message including an indication of a preference of the UE to switch the nDDS from a connected state to an inactive state in response to a release message from the base station.

By including or configuring the communications manager 1320 in accordance with examples as described herein, the device 1305 may support techniques for preference signaling for an MSIM device, which may reduce latency and reduce power consumption. The techniques described herein may further reduce power consumption and signaling loads while switching a subscription between a connected state and an idle state.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of preference signaling for a multi-subscription wireless device as described herein, or the processor 1340 and the memory 1330 may be otherwise configured to perform or support such operations.

Figure 14:
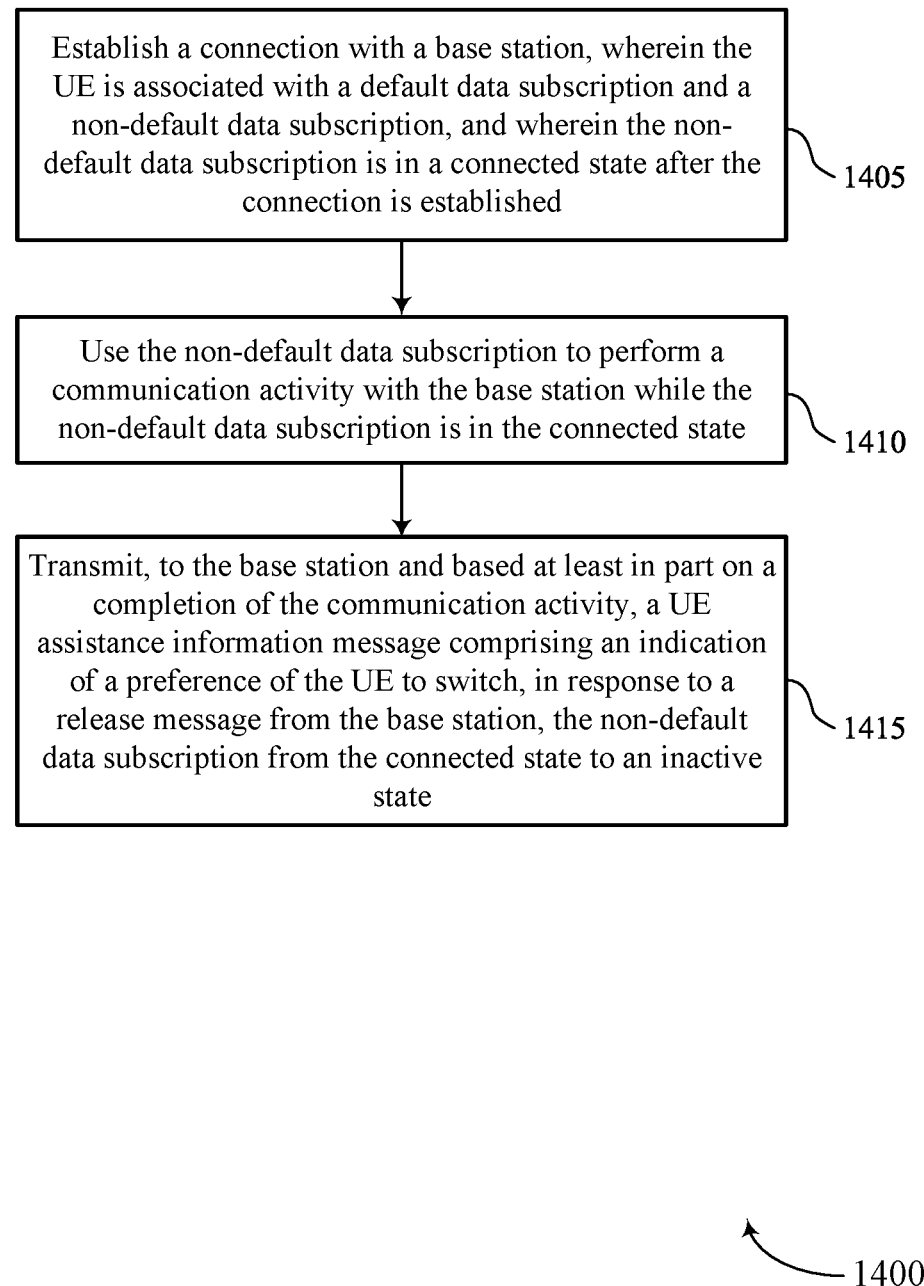
FIGS. 14 through 17 show flowcharts illustrating methods that support preference signaling for a multi-subscription wireless device in accordance with aspects of the present disclosure.

FIG. 14 shows a flowchart illustrating a method 1400 that supports preference signaling for a multi-subscription wireless device in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include establishing a connection with a base station, where the UE is associated with a DDS and an nDDS, and where the nDDS is in a connected state after the connection is established. The operations of 1405 may be performed in accordance with examples as disclosed herein. In some examples, aspects of the operations of 1405 may be performed by a connection establishment component 825 as described with reference to FIG. 8.

At 1410, the method may include using the nDDS to perform a communication activity with the base station while the nDDS is in the connected state. The operations of 1410 may be performed in accordance with examples as disclosed herein. In some examples, aspects of the operations of 1410 may be performed by a communication activity component 830 as described with reference to FIG. 8.

At 1415, the method may include transmitting, to the base station and based on a completion of the communication activity, a UAI message including an indication of a preference of the UE to switch, in response to a release message from the base station, the nDDS from the connected state to an inactive state. The operations of 1415 may be performed in accordance with examples as disclosed herein. In some examples, aspects of the operations of 1415 may be performed by a UAI transmission component 835 as described with reference to FIG. 8.

Figure 15:
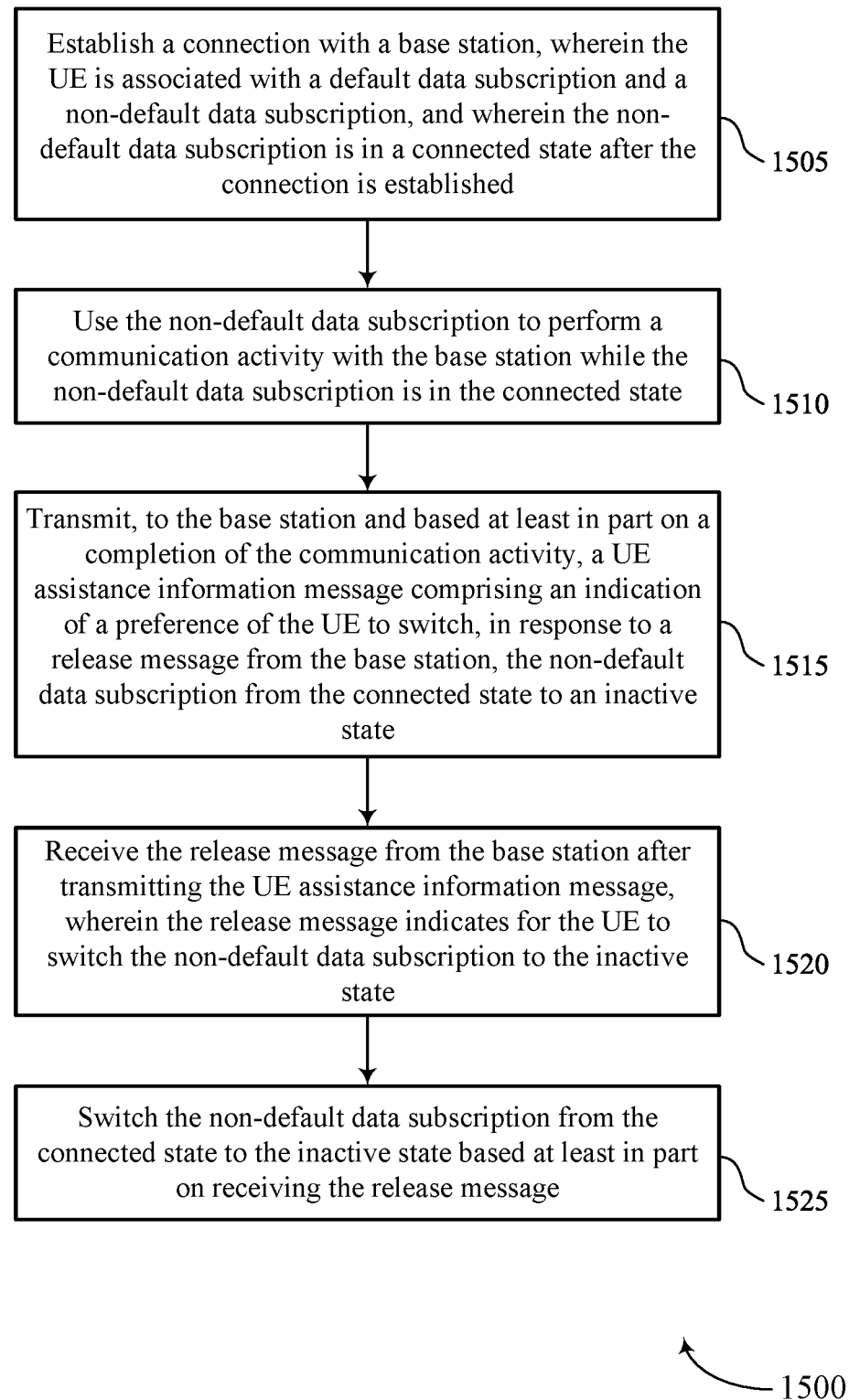

FIG. 15 shows a flowchart illustrating a method 1500 that supports preference signaling for a multi-subscription wireless device in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include establishing a connection with a base station, where the UE is associated with a DDS and an nDDS, and where the nDDS is in a connected state after the connection is established. The operations of 1505 may be performed in accordance with examples as disclosed herein. In some examples, aspects of the operations of 1505 may be performed by a connection establishment component 825 as described with reference to FIG. 8.

At 1510, the method may include using the nDDS to perform a communication activity with the base station while the nDDS is in the connected state. The operations of 1510 may be performed in accordance with examples as disclosed herein. In some examples, aspects of the operations of 1510 may be performed by a communication activity component 830 as described with reference to FIG. 8.

At 1515, the method may include transmitting, to the base station and based on a completion of the communication activity, a UAI message including an indication of a preference of the UE to switch, in response to a release message from the base station, the nDDS from the connected state to an inactive state. The operations of 1515 may be performed in accordance with examples as disclosed herein. In some examples, aspects of the operations of 1515 may be performed by a UAI transmission component 835 as described with reference to FIG. 8.

At 1520, the method may include receiving the release message from the base station after transmitting the UAI, where the release message indicates for the UE to switch the nDDS to the inactive state. The operations of 1520 may be performed in accordance with examples as disclosed herein. In some examples, aspects of the operations of 1520 may be performed by a release message reception component 840 as described with reference to FIG. 8.

At 1525, the method may include switching the nDDS from the connected state to the inactive state based on receiving the release message. The operations of 1525 may be performed in accordance with examples as disclosed herein. In some examples, aspects of the operations of 1525 may be performed by a nDDS switching component 845 as described with reference to FIG. 8.

Figure 16:
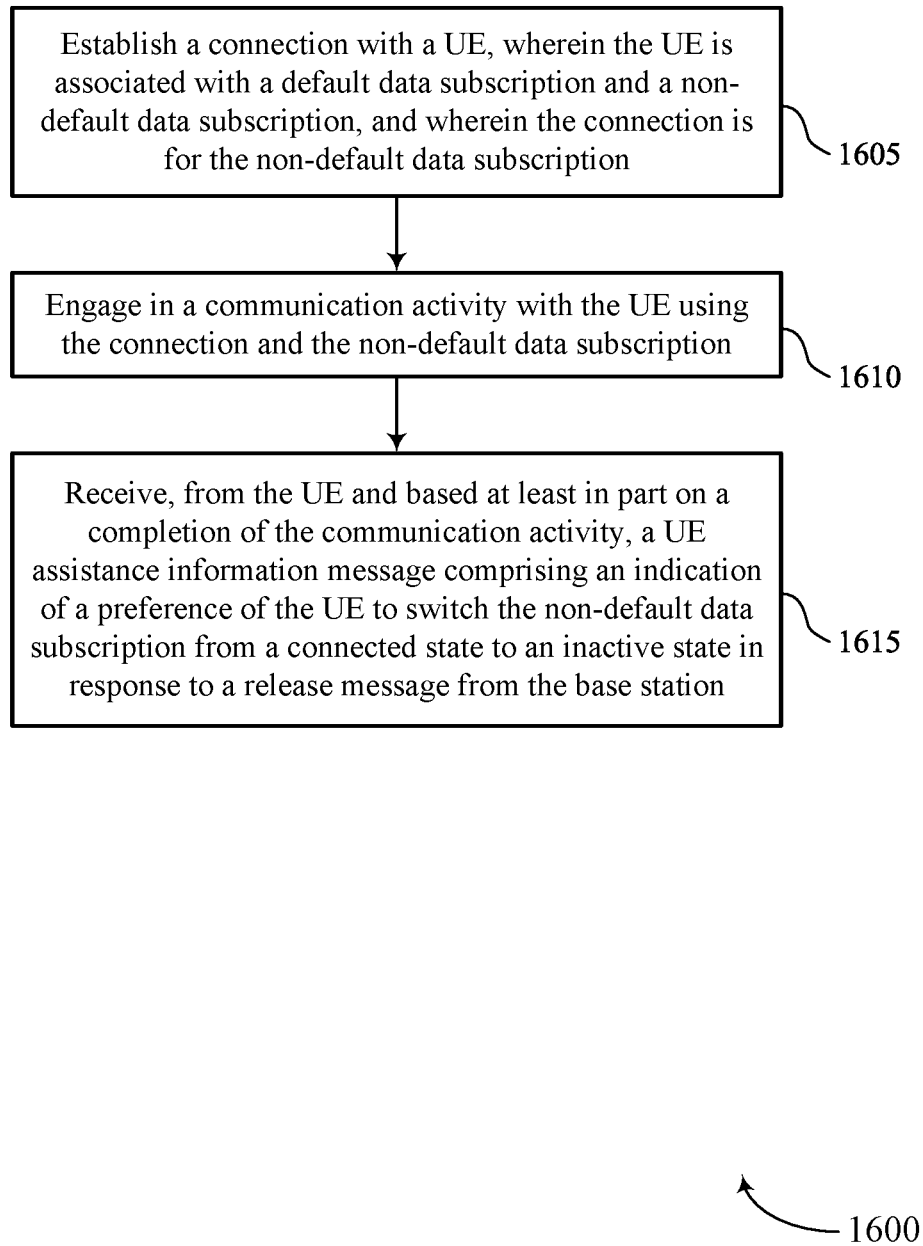

FIG. 16 shows a flowchart illustrating a method 1600 that supports preference signaling for a multi-subscription wireless device in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include establishing a connection with a UE, where the UE is associated with a DDS and an nDDS, and where the connection is for the nDDS. The operations of 1605 may be performed in accordance with examples as disclosed herein. In some examples, aspects of the operations of 1605 may be performed by a connection component 1225 as described with reference to FIG. 12.

At 1610, the method may include engaging in a communication activity with the UE using the connection and the non nDDS. The operations of 1610 may be performed in accordance with examples as disclosed herein. In some examples, aspects of the operations of 1610 may be performed by a communication engagement component 1230 as described with reference to FIG. 12.

At 1615, the method may include receiving, from the UE and based on a completion of the communication activity, a UAI message including an indication of a preference of the UE to switch, in response to a release message from the base station, the nDDS from a connected state to an inactive state. The operations of 1615 may be performed in accordance with examples as disclosed herein. In some examples, aspects of the operations of 1615 may be performed by a UAI reception component 1235 as described with reference to FIG. 12.

Figure 17:
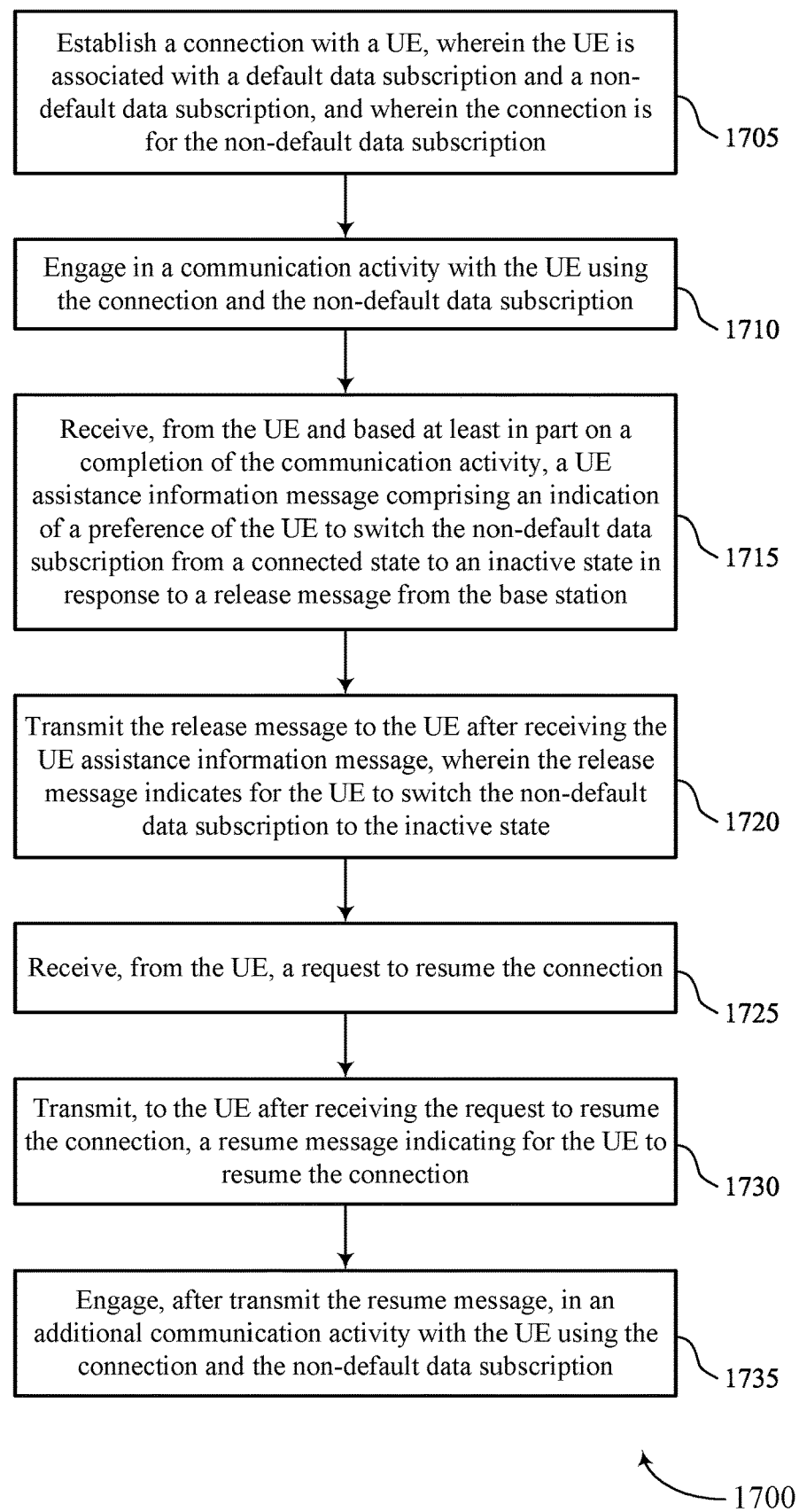

FIG. 17 shows a flowchart illustrating a method 1700 that supports preference signaling for a multi-subscription wireless device in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include establishing a connection with a UE, where the UE is associated with a DDS and an nDDS, and where the connection is for the nDDS. The operations of 1705 may be performed in accordance with examples as disclosed herein. In some examples, aspects of the operations of 1705 may be performed by a connection component 1225 as described with reference to FIG. 12.

At 1710, the method may include engaging in a communication activity with the UE using the connection and the nDDS. The operations of 1710 may be performed in accordance with examples as disclosed herein. In some examples, aspects of the operations of 1710 may be performed by a communication engagement component 1230 as described with reference to FIG. 12.

At 1715, the method may include receiving, from the UE and based on a completion of the communication activity, a UAI message including an indication of a preference of the UE to switch the nDDS from a connected state to an inactive state in response to a release message from the base station. The operations of 1715 may be performed in accordance with examples as disclosed herein. In some examples, aspects of the operations of 1715 may be performed by a UAI reception component 1235 as described with reference to FIG. 12.

At 1720, the method may include transmitting the release message to the UE after receiving the UAI, where the release message indicates for the UE to switch the nDDS to the inactive state. The operations of 1720 may be performed in accordance with examples as disclosed herein. In some examples, aspects of the operations of 1720 may be performed by a release message transmission component 1240 as described with reference to FIG. 12.

At 1725, the method may include receiving, from the UE, a request to resume the connection. The operations of 1725 may be performed in accordance with examples as disclosed herein. In some examples, aspects of the operations of 1725 may be performed by a resume request reception component 1250 as described with reference to FIG. 12.

At 1730, the method may include transmitting, to the UE after receiving the request to resume the connection, a resume message indicating for the UE to resume the connection. The operations of 1730 may be performed in accordance with examples as disclosed herein. In some examples, aspects of the operations of 1730 may be performed by a resume message transmission component 1255 as described with reference to FIG. 12.

At 1735, the method may include engaging, after transmitting the resume message, in an additional communication activity with the UE using the connection and the nDDS. The operations of 1735 may be performed in accordance with examples as disclosed herein. In some examples, aspects of the operations of 1735 may be performed by a communication engagement component 1230 as described with reference to FIG. 12.

The following provides an overview of aspects of the present disclosure:

Aspect 1: A method for wireless communication at a UE, comprising: establishing a connection with a base station, wherein the UE is associated with a DDS and an nDDS, and wherein the nDDS is in a connected state after the connection is established; using the nDDS to perform a communication activity with the base station while the nDDS is in the connected state; and transmitting, to the base station and based at least in part on a completion of the communication activity, a UAI message comprising an indication of a preference of the UE to switch, in response to a release message from the base station, the nDDS from the connected state to an inactive state.

Aspect 2: The method of aspect 1, further comprising: receiving the release message from the base station after transmitting the UAI message, wherein the release message indicates for the UE to switch the nDDS to the inactive state; and switching the nDDS from the connected state to the inactive state based at least in part on receiving the release message.

Aspect 3: The method of aspect 2, wherein the release message comprises an RRC release message.

Aspect 4: The method of any of aspects 2 through 3, further comprising: transmitting, to the base station, a request to resume the connection based at least in part on an additional communication activity for the nDDS; receiving, from the base station after transmitting the request to resume the connection, a resume message indicating for the UE to resume the connection; switching the nDDS from the inactive state to the connected state based at least in part on receiving the resume message; and using the nDDS, after receiving the resume message, to perform the additional communication activity with the base station while the nDDS is in the connected state.

Aspect 5: The method of any of aspects 2 through 4, further comprising: receiving, from the base station, an indication of a first duration of a first timer, wherein an expiration of the first timer is associated with the UE performing an RNAU procedure after switching the nDDS from the connected state to the inactive state; configuring a second timer with a second duration shorter than the first duration; initiating the second timer based at least in part on switching the nDDS from the connected state to the inactive state; evaluating a status of the DDS based at least in part on an expiration of the second timer; and performing the RNAU procedure at a time that is based at least in part on the status of the DDS.

Aspect 6: The method of aspect 5, further comprising: initiating a third timer with a third duration based at least in part on the status of the DDS comprising the DDS being in the connected state and engaged in a second communication activity; and monitoring the status of the DDS after reinitiating the second timer and before an expiration of the third timer.

Aspect 7: The method of aspect 6, further comprising: detecting a switch of the DDS from the connected state to an idle state based at least in part on monitoring the status of the DDS, wherein performing the RNAU procedure is based at least in part on the switch of the DDS from the connected state to the idle state, and wherein the time is independent of a value of the third timer.

Aspect 8: The method of any of aspects 6 through 7, further comprising: continuing to monitor the status of the DDS after the expiration of the third timer based at least in part on the DDS being in the connected state and engaged in the second communication activity throughout the third duration; and detecting a cessation of the second communication activity based at least in part on continuing to monitor the status of the DDS, wherein performing the RNAU procedure is based at least in part on the cessation of the second communication activity, and wherein the time is after the expiration of the third timer.

Aspect 9: The method of any of aspects 6 through 8, further comprising: detecting a cessation of the second communication activity based at least in part on monitoring the status of the DDS, wherein performing the RNAU procedure is based at least in part on the cessation of the second communication activity, and wherein the time is before the expiration of the third timer.

Aspect 10: The method of any of aspects 6 through 9, wherein the third duration is equal to a difference between the first duration and the second duration.

Aspect 11: The method of any of aspects 5 through 10, further comprising: initiating a third timer with a third duration based at least in part on the status of the DDS comprising the DDS being in the connected state with no ongoing activity, wherein performing the RNAU procedure is based at least in part on the DDS being in the connected state with no ongoing activity, and wherein the time is no earlier than the expiration of the third timer.

Aspect 12: The method of aspect 11, wherein the third duration is equal to a difference between the first duration and the second duration.

Aspect 13: The method of any of aspects 5 through 12, wherein, based at least in part on the status of the DDS comprising the DDS being in an idle state, the time corresponds to an earliest opportunity of the UE after evaluating the status of the DDS.

Aspect 14: The method of any of aspects 5 through 13, wherein a duration between initiating the second timer and the time is less than the first duration.

Aspect 15: The method of any of aspects 1 through 14, further comprising: transmitting, to the base station, an indication of a second preference of the UE for an extended duration of a timer associated with the UE performing an RNAU procedure after switching the nDDS from the connected state to the inactive state, the extended duration longer than a default duration of the timer.

Aspect 16: The method of aspect 15, wherein the indication of the second preference is transmitted as part of the UAI.

Aspect 17: The method of any of aspects 1 through 16, wherein the preference of the UE to switch the nDDS from the connected state to the inactive state in response to the release message from the base station comprises a preference to not switch the nDDS to an idle state in response to the release message.

Aspect 18: A method for wireless communication at a base station, comprising: establishing a connection with a UE, wherein the UE is associated with a DDS and an nDDS, and wherein the connection is for the nDDS; engaging in a communication activity with the UE using the connection and the nDDS; and receiving, from the UE and based at least in part on a completion of the communication activity, a UAI message comprising an indication of a preference of the UE to switch the nDDS from a connected state to an inactive state in response to a release message from the base station.

Aspect 19: The method of aspect 18, further comprising: transmitting the release message to the UE after receiving the UAI message, wherein the release message indicates for the UE to switch the nDDS to the inactive state.

Aspect 20: The method of aspect 19, wherein the release message comprises an RRC release message.

Aspect 21: The method of any of aspects 19 through 20, further comprising: receiving, from the UE, a request to resume the connection; transmitting, to the UE after receiving the request to resume the connection, a resume message indicating for the UE to resume the connection; and engaging, after transmitting the resume message, in an additional communication activity with the UE using the connection and the nDDS.

Aspect 22: The method of any of aspects 18 through 21, further comprising: receiving, from the UE, an indication of a second preference of the UE for an extended duration of a timer associated with the UE performing an RNAU procedure after switching the nDDS from the connected state to the inactive state, the extended duration longer than a default duration of the timer.

Aspect 23: The method of aspect 22, wherein the indication of the second preference is received as part of the UAI.

Aspect 24: The method of any of aspects 18 through 23, wherein the preference of the UE to switch the nDDS to the inactive state in response to the release message from the base station comprises a preference to not switch the nDDS to an idle state in response to the release message.

Aspect 25: An apparatus for wireless communication at a UE, comprising a processor; memory coupled with the processor; and instructions stored in the memory and executable by the processor to cause the apparatus to perform a method of any of aspects 1 through 17.

Aspect 26: An apparatus for wireless communication at a UE, comprising at least one means for performing a method of any of aspects 1 through 17.

Aspect 27: A non-transitory computer-readable medium storing code for wireless communication at a UE, the code comprising instructions executable by a processor to perform a method of any of aspects 1 through 17.

Aspect 28: An apparatus for wireless communication at a base station, comprising a processor; memory coupled with the processor; and instructions stored in the memory and executable by the processor to cause the apparatus to perform a method of any of aspects 18 through 24.

Aspect 29: An apparatus for wireless communication at a base station, comprising at least one means for performing a method of any of aspects 18 through 24.

Aspect 30: A non-transitory computer-readable medium storing code for wireless communication at a base station, the code comprising instructions executable by a processor to perform a method of any of aspects 18 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    a processor;
    memory coupled with the processor; and
    instructions stored in the memory and executable by the processor to cause the apparatus to:
        establish a connection with a network device, wherein the UE is associated with a default data subscription and a non-default data subscription, and wherein the non-default data subscription is in a connected state after the connection is established;
        use the non-default data subscription to perform a communication activity with the network device while the non-default data subscription is in the connected state, wherein the communication activity comprises a data activity; and
        transmit, in response to a completion of the data activity, a UE assistance information message comprising an indication of a preference of the UE to switch, if the UE subsequently receives a release message after the completion of the data activity, the non-default data subscription from the connected state to an inactive state.

2. The apparatus of claim 1, wherein the instructions are further executable by the processor to cause the apparatus to:
    receive the release message after transmitting the UE assistance information message, wherein the release message indicates for the UE to switch the non-default data subscription to the inactive state; and switch the non-default data subscription from the connected state to the inactive state based at least in part on receiving the release message.

3. The apparatus of claim 2, wherein the release message comprises a radio resource control release message.

4. The apparatus of claim 2, wherein the instructions are further executable by the processor to cause the apparatus to:
transmit a request to resume the connection based at least in part on an additional communication activity for the non-default data subscription;
receive, after transmitting the request to resume the connection, a resume message indicating for the UE to resume the connection;
switch the non-default data subscription from the inactive state to the connected state based at least in part on receiving the resume message; and
use the non-default data subscription, after receiving the resume message, to perform the additional communication activity with the network device while the non-default data subscription is in the connected state.

5. The apparatus of claim 2, wherein the instructions are further executable by the processor to cause the apparatus to:
receive an indication of a first duration of a first timer, wherein an expiration of the first timer is associated with the UE performing a radio access network area update procedure after switching the non-default data subscription from the connected state to the inactive state;
configure a second timer with a second duration shorter than the first duration;
initiate the second timer based at least in part on switching the non-default data subscription from the connected state to the inactive state;
evaluate a status of the default data subscription based at least in part on an expiration of the second timer; and
perform the radio access network area update procedure at a time that is based at least in part on the status of the default data subscription.

6. The apparatus of claim 5, wherein the instructions are further executable by the processor to cause the apparatus to:
initiate a third timer with a third duration based at least in part on the status of the default data subscription comprising the default data subscription being in the connected state and engaged in a second communication activity; and
monitor the status of the default data subscription after reinitiating the second timer and before an expiration of the third timer.

7. The apparatus of claim 6, wherein the instructions are further executable by the processor to cause the apparatus to:
detect a switch of the default data subscription from the connected state to an idle state based at least in part on monitoring the status of the default data subscription, wherein performing the radio access network area update procedure is based at least in part on the switch of the default data subscription from the connected state to the idle state, and wherein the time is independent of a value of the third timer.

8. The apparatus of claim 6, wherein the instructions are further executable by the processor to cause the apparatus to:
continue to monitor the status of the default data subscription after the expiration of the third timer based at least in part on the default data subscription being in the connected state and engaged in the second communication activity throughout the third duration; and
detect a cessation of the second communication activity based at least in part on continuing to monitor the status of the default data subscription, wherein performing the radio access network area update procedure is based at least in part on the cessation of the second communication activity, and wherein the time is after the expiration of the third timer.

9. The apparatus of claim 6, wherein the instructions are further executable by the processor to cause the apparatus to:
detect a cessation of the second communication activity based at least in part on monitoring the status of the default data subscription, wherein performing the radio access network area update procedure is based at least in part on the cessation of the second communication activity, and wherein the time is before the expiration of the third timer.

10. The apparatus of claim 6, wherein the third duration is equal to a difference between the first duration and the second duration.

11. The apparatus of claim 5, wherein the instructions are further executable by the processor to cause the apparatus to:
initiate a third timer with a third duration based at least in part on the status of the default data subscription comprising the default data subscription being in the connected state with no ongoing activity, wherein performing the radio access network area update procedure is based at least in part on the default data subscription being in the connected state with no ongoing activity, and wherein the time is no earlier than the expiration of the third timer.

12. The apparatus of claim 11, wherein the third duration is equal to a difference between the first duration and the second duration.

13. The apparatus of claim 5, wherein based at least in part on the status of the default data subscription comprising the default data subscription being in an idle state, the time corresponds to an earliest opportunity of the UE after evaluating the status of the default data subscription.

14. The apparatus of claim 5, wherein a duration between initiating the second timer and the time is less than the first duration.

15. The apparatus of claim 1, wherein the instructions are further executable by the processor to cause the apparatus to:
transmit an indication of a second preference of the UE for an extended duration of a timer associated with the UE performing a radio access network area update procedure after switching the non-default data subscription from the connected state to the inactive state, the extended duration longer than a default duration of the timer.

16. The apparatus of claim 15, wherein the indication of the second preference is transmitted as part of the UE assistance information message.

17. The apparatus of claim 1, wherein the preference of the UE to switch the non-default data subscription from the connected state to the inactive state in response to the release message comprises a preference to not switch the non-default data subscription to an idle state in response to the release message.

18. An apparatus for wireless communication at a network device, comprising:
a processor;
memory coupled with the processor; and
instructions stored in the memory and executable by the processor to cause the apparatus to:
establish a connection with a user equipment (UE), wherein the UE is associated with a default data subscription and a non-default data subscription, and wherein the connection is for the non-default data subscription;

engage in a communication activity with the UE using the connection and the non-default data subscription, wherein the communication activity comprises a data activity; and receive, in response to a completion of the data activity, a UE assistance information message comprising an indication of a preference of the UE to switch, if the UE subsequently receives a release message after the completion of the data activity, the non-default data subscription from a connected state to an inactive state.

19. The apparatus of claim 18, wherein the instructions are further executable by the processor to cause the apparatus to:

transmit the release message to the UE after receiving the UE assistance information message, wherein the release message indicates for the UE to switch the non-default data subscription to the inactive state.

20. The apparatus of claim 19, wherein the release message comprises a radio resource control release message.

21. The apparatus of claim 19, wherein the instructions are further executable by the processor to cause the apparatus to:

receive, from the UE, a request to resume the connection;

transmit, to the UE after receiving the request to resume the connection, a resume message indicating for the UE to resume the connection; and engage, after transmitting the resume message, in an additional communication activity with the UE using the connection and the non-default data subscription.

22. The apparatus of claim 18, wherein the instructions are further executable by the processor to cause the apparatus to:

receive, from the UE, an indication of a second preference of the UE for an extended duration of a timer associated with the UE performing a radio access network area update procedure after switching the non-default data subscription from the connected state to the inactive state, the extended duration longer than a default duration of the timer.

23. The apparatus of claim 22, wherein the indication of the second preference is received as part of the UE assistance information message.

24. The apparatus of claim 18, wherein the preference of the UE to switch the non-default data subscription to the inactive state in response to the release message comprises a preference to not switch the non-default data subscription to an idle state in response to the release message.

25. A method for wireless communication at a user equipment (UE), comprising:

establishing a connection with a network device, wherein the UE is associated with a default data subscription and a non-default data subscription, and wherein the non-default data subscription is in a connected state after the connection is established;

using the non-default data subscription to perform a communication activity with the network device while the non-default data subscription is in the connected state, wherein the communication activity comprises a data activity; and transmitting, in response to a completion of the data activity, a UE assistance information message comprising an indication of a preference of the UE to switch, if the UE subsequently receives a release message after the completion of the data activity, the non-default data subscription from the connected state to an inactive state.

26. The method of claim 25, further comprising:

receiving the release message after transmitting the UE assistance information message, wherein the release message indicates for the UE to switch the non-default data subscription to the inactive state; and switching the non-default data subscription from the connected state to the inactive state based at least in part on receiving the release message.

27. The method of claim 26, further comprising:

transmitting a request to resume the connection based at least in part on an additional communication activity for the non-default data subscription;

receiving, after transmitting the request to resume the connection, a resume message indicating for the UE to resume the connection;

switching the non-default data subscription from the inactive state to the connected state based at least in part on receiving the resume message; and using the non-default data subscription, after receiving the resume message, to perform the additional communication activity with the network device while the non-default data subscription is in the connected state.

28. The method of claim 26, further comprising:

receiving an indication of a first duration of a first timer, wherein an expiration of the first timer is associated with the UE performing a radio access network area update procedure after switching the non-default data subscription from the connected state to the inactive state;

configuring a second timer with a second duration shorter than the first duration;

initiating the second timer based at least in part on switching the non-default data subscription from the connected state to the inactive state;

evaluating a status of the default data subscription based at least in part on an expiration of the second timer; and performing the radio access network area update procedure at a time that is based at least in part on the status of the default data subscription.

29. A method for wireless communication at a network device, comprising:

establishing a connection with a user equipment (UE), wherein the UE is associated with a default data subscription and a non-default data subscription, and wherein the connection is for the non-default data subscription;

engaging in a communication activity with the UE using the connection and the non-default data subscription, wherein the communication activity comprises a data activity; and receiving, in response to a completion of the data activity, a UE assistance information message comprising an indication of a preference of the UE to switch, if the UE subsequently receives a release message after the completion of the data activity, the non-default data subscription from a connected state to an inactive state.

30. The method of claim 29, further comprising:

transmitting the release message to the UE after receiving the UE assistance information message, wherein the release message indicates for the UE to switch the non-default data subscription to the inactive state.

* * * * *